United States Patent
Liebig et al.

(10) Patent No.: US 9,483,521 B2
(45) Date of Patent: Nov. 1, 2016

(54) ABSTRACTION REFINEMENT FOR SCALABLE TYPE REASONING IN ONTOLOGY-BASED DATA REPOSITORIES

(71) Applicant: derivo GmbH, Ulm (DE)

(72) Inventors: Thorsten Liebig, Ulm (DE); Vincent Vialard, Ulm (DE); Birte Glimm, Ulm (DE); Evgeny Kazakov, Ulm (DE); Trung Kien Tran, Ulm (DE)

(73) Assignee: DERIVO GMBH, Ulm (DE)

( * ) Notice: Subject to any disclaimer, the term of this patent is extended or adjusted under 35 U.S.C. 154(b) by 0 days.

(21) Appl. No.: 14/793,354

(22) Filed: Jul. 7, 2015

(65) Prior Publication Data
US 2016/0004965 A1    Jan. 7, 2016

(30) Foreign Application Priority Data
Jul. 7, 2014    (EP) .................................... 14176027

(51) Int. Cl.
G06F 17/00  (2006.01)
G06N 5/00   (2006.01)
G06F 17/30  (2006.01)
G06N 5/02   (2006.01)

(52) U.S. Cl.
CPC .......... *G06F 17/30389* (2013.01); *G06N 5/02* (2013.01)

(58) Field of Classification Search
USPC ......................................................... 706/45
See application file for complete search history.

(56) References Cited

U.S. PATENT DOCUMENTS

| | | | | |
|---|---|---|---|---|
| 7,716,214 B2 * | 5/2010 | Li | ................... | G06F 17/30312 |
| | | | | 707/719 |
| 7,823,120 B2 * | 10/2010 | Kazakov | ................... | G06F 8/10 |
| | | | | 717/104 |
| 7,904,401 B2 * | 3/2011 | Dolby | ................... | G06N 5/02 |
| | | | | 706/45 |
| 2007/0180424 A1 * | 8/2007 | Kazakov | ................... | G06F 8/10 |
| | | | | 717/104 |
| 2012/0278273 A1 | 11/2012 | Fang | | |
| 2016/0004965 A1 * | 1/2016 | Liebig | ................... | G06N 5/02 |
| | | | | 706/45 |

FOREIGN PATENT DOCUMENTS

CN    103380426 A    10/2013

OTHER PUBLICATIONS

LiteMat: A scalable, cost-efficient inference encoding scheme for large RDF graphs Olivier Cure; Hubert Naacke; Tendry Randriamalala; Bernd Amann Big Data (Big Data), 2015 IEEE International Conference on Year: 2015 pp. 1823-1830, DOI: 10.1109/BigData.2015.7363955 IEEE Conference Publications.*
Dolby, Julian et al., "Scalable highly expressive reasoned (SHER)," *Web Semantics: Science, Services and Agents on the World Wide Web*, 7 (2009), 2009, pp. 357-361, Document XP026781943.
Fokoue, Achille et al., "The Summary Abox: Cutting Ontologies Down to Size," *Proceedings of the 5th International Semantic Web Conference*, 2006, Springer, vol. 4273, pp. 343-356, Document XP002733164.
Kolovski, Vladimir et al., "Optimizing Enterprise-Scale OWL 2 RL Reasoning in a Relational Database System," *The Semantic Web—ISWC 2010*, Part I, LNCS 6496, 2010, pp. 436-452, Document XP019159311.
Wandelt, Sebastian et al., "Towards ABox Modularization of semi-expressive Description Logics," *Applied Ontology*, 0 (2012) 1-0, IOS Press, 2012, pp. 1-33, Document XP055155770.
Extended European Search Report in corresponding European Application No. 14176027.2, dated Dec. 15, 2014, 11 pages.

* cited by examiner

*Primary Examiner* — Michael B Holmes
(74) *Attorney, Agent, or Firm* — Brinks Gilson & Lione

(57) ABSTRACT

A computer-implemented method for computing a concept materialization of an ontology is presented whereby a compression technique called "ABox abstraction and refinement" is used that may significantly reduce time, memory, and computing resources for reasoning and in particular for computing and outputting the materialization.

7 Claims, 9 Drawing Sheets

Fig. 2

| Roles: | | |
|---|---|---|
| atomic role | $R$ | $R^{\mathcal{I}} \subseteq \Delta^{\mathcal{I}} \times \Delta^{\mathcal{I}}$ (given by $\mathcal{I}$) |
| inverse role | $R^-$ | $\{\langle e,d\rangle \mid \langle d,e\rangle \in R^{\mathcal{I}}\}$ |
| Concepts: | | |
| atomic concept | $A$ | $A \subseteq \Delta^{\mathcal{I}}$ (given by $\mathcal{I}$) |
| nominal | $o$ | $o^{\mathcal{I}} \subseteq \Delta^{\mathcal{I}}, \|o^{\mathcal{I}}\| = 1$ (given by $\mathcal{I}$) |
| top | $\top$ | $\Delta^{\mathcal{I}}$ |
| bottom | $\bot$ | $\emptyset$ |
| negation | $\neg C$ | $\Delta^{\mathcal{I}} \setminus C^{\mathcal{I}}$ |
| conjunction | $C \sqcap D$ | $C^{\mathcal{I}} \cap D^{\mathcal{I}}$ |
| disjunction | $C \sqcup D$ | $C^{\mathcal{I}} \cup D^{\mathcal{I}}$ |
| existential restriction | $\exists R.C$ | $\{d \mid \exists e \in C^{\mathcal{I}} : \langle d,e\rangle \in R^{\mathcal{I}}\}$ |
| universal restriction | $\forall R.C$ | $\{d \mid \forall e \in \Delta^{\mathcal{I}} : \langle d,e\rangle \in R^{\mathcal{I}} \to e \in C^{\mathcal{I}}\}$ |
| Axioms: | | |
| concept inclusion | $C \sqsubseteq D$ | $C^{\mathcal{I}} \subseteq D^{\mathcal{I}}$ |
| role inclusion | $R \sqsubseteq S$ | $R^{\mathcal{I}} \subseteq S^{\mathcal{I}}$ |
| concept assertion | $C(a)$ | $a^{\mathcal{I}} \in C^{\mathcal{I}}$ |
| role assertion | $R(a,b)$ | $\langle a^{\mathcal{I}}, b^{\mathcal{I}}\rangle \in R^{\mathcal{I}}$ |

Fig. 3

ABox: $\mathcal{A} =$

[graph diagram with nodes $a, b, c, d, e$ labeled with $A^{(I)}, B^{(II)}, A^{(III)}, B^{(III)}$]

TBox: $\mathcal{T} =$ $A \sqsubseteq \forall R.B$ $B \sqsubseteq \forall R^-.A$

| Materialized abstract ABoxes | Abstractions I | II | III |
|---|---|---|---|
| $\circ\, y^R_{tp_1}$ $\,\, x_{tp_1}$ $\,\, z^R_{tp_1}$ | $\{c,e,a,d\}$ $\{b,c,e\}$ $\{a,b,d\}$ | | |
| $+B\,\, \circ\, y^R_{tp_2}$ $A\,\, x_{tp_2}$ $\,\, z^R_{tp_2}$ | $\{b,e,c\}$ $\{a,d\}$ $\{c,e\}$ | $\{b,e,c\}$ $\{a,d\}$ $\{c,e\}$ | $\{b,e,c\}$ $\{a,d\}$ $\{c,e\}$ |
| $\circ\, y^R_{tp_3}$ $B\,\, x_{tp_3}$ $+A\,\, z^R_{tp_3}$ | | $\{c,e,a,d\}$ $\{b,e,c\}$ $\{a,b,d\}$ | $\{a,d\}$ $\{c,e\}$ $\{b,d,a\}$ |
| $+B\,\, \circ\, y^R_{tp_4}$ $A,B\,\, x_{tp_4}$ $+A\,\, z^R_{tp_4}$ | | | $\{c,e\}$ $\{b\}$ $\{a\}$ |

Fig. 4

| Ontology | #A | #$A_N$ | #R | #I | #R(a,b) | #A(a) | #A(a) inferred |
|---|---:|---:|---:|---:|---:|---:|---:|
| Gazetteer | 710 | 711 | 15 | 516 150 | 604 164 | 11 112 | 538 799 |
| Coburn | 719 | 1 161 | 109 | 123 515 | 237 620 | 297 002 | 535 124 |
| Food | 657 | 657 | 110 | 13 724 | 195 025 | 13 649 | 28 916 |
| Financial | 64 | 73 | 16 | 17 941 | 47 248 | 17 941 | 38 036 |
| CNRKB | 12 | 12 | 47 | 6 033 | 147 118 | 6 033 | 6 033 |
| Siebert | 292 | 448 | 23 | 49 171 | 91 256 | 106 767 | 67 663 |
| Biocaster | 298 | 299 | 51 | 25 628 | 71 804 | 25 628 | 59 398 |
| LUBM 1 | 43 | 49 | 25 | 17 174 | 49 336 | 18 128 | 48 326 |
| LUBM 10 | 43 | 49 | 25 | 207 426 | 630 753 | 219 680 | 593 485 |
| LUBM 50 | 43 | 49 | 25 | 1 082 818 | 3 298 813 | 1 147 136 | 3 097 722 |
| LUBM 100 | 43 | 49 | 25 | 2 153 645 | 6 645 928 | 2 281 035 | 6 164 538 |
| UOBM 1 | 69 | 90 | 35 | 24 925 | 153 571 | 44 680 | 142 747 |
| UOBM 10 | 69 | 90 | 35 | 242 549 | 1 500 628 | 434 115 | 1 381 722 |
| UOBM 50 | 69 | 90 | 35 | 1 227 445 | 7 594 996 | 2 197 035 | 6 991 583 |
| UOBM 100 | 69 | 90 | 35 | 2 462 012 | 15 241 909 | 4 409 891 | 14 027 772 |
| Robert | 61 | 135 | 80 | 405 | 1 089 | 1 | 4 255 |

Fig. 5

| Ontology | # of steps | Abstract ABox size | | | | Abstract ABox size (%) | | | |
|---|---|---|---|---|---|---|---|---|---|
| | | # indiv. | | # assertions | | % indiv. | | % assertions | |
| Gazetteer | 1 | 5 640 | 5 640 | 5 142 | 8 512 | 1.09 | 1.09 | 0.79 | 1.31 |
| Coburn | 2 | 3 992 | 4 059 | 5 569 | 8 633 | 3.23 | 3.29 | 1.04 | 2.16 |
| Food | 1 | 3 288 | 3 288 | 3 288 | 5 803 | 23.96 | 23.96 | 1.58 | 2.78 |
| Financial | 2 | 154 | 642 | 157 | 1 092 | 0.86 | 3.58 | 0.24 | 1.68 |
| CNRKB | 1 | 1 458 | 1 458 | 1 458 | 1 538 | 24.17 | 24.17 | 0.95 | 1.00 |
| Siebert | 2 | 1 498 | 1 534 | 2 036 | 2 616 | 3.05 | 3.12 | 1.03 | 1.32 |
| Biocaster | 1 | 12 359 | 12 359 | 12 359 | 17 843 | 48.22 | 48.22 | 12.68 | 18.31 |
| LUBM 1 | 1 | 139 | 139 | 143 | 254 | 0.81 | 0.81 | 0.21 | 0.38 |
| LUBM 10 | 1 | 154 | 154 | 158 | 281 | 0.07 | 0.07 | 0.02 | 0.03 |
| LUBM 50 | 1 | 148 | 148 | 152 | 271 | 0.01 | 0.01 | 0.003 | 0.006 |
| LUBM 100 | 1 | 148 | 148 | 152 | 271 | 0.007 | 0.007 | 0.002 | 0.003 |
| UOBM 1 | 2 | 25 378 | 39 322 | 31 659 | 101 324 | 101.82 | 157.76 | 15.97 | 51.11 |
| UOBM 10 | 2 | 98 266 | 169 579 | 125 056 | 448 400 | 40.51 | 69.92 | 6.46 | 23.18 |
| UOBM 50 | 2 | 226 176 | 395 956 | 290 652 | 1 057 854 | 18.43 | 32.26 | 2.97 | 10.80 |
| UOBM 100 | 2 | 311 574 | 547 361 | 402 188 | 1 472 058 | 12.66 | 22.23 | 2.05 | 7.49 |
| Robert | 6 | 361 | 576 | 300 | 3 328 | 89 | 142 | 28 | 305 |

Fig. 6

| Ontology | # Individual types | | Individual type statistics | | | | | |
|---|---|---|---|---|---|---|---|---|
| | | | # indiv. / type | | #$A_N$/type | | #$R$/type | |
| Gazetteer | 1 845 | 1 845 | 280 | 280 | 0.73 | 2.56 | 2.05 | 2.05 |
| Coburn | 1 056 | 1 072 | 117 | 115 | 2.49 | 5.27 | 2.79 | 2.79 |
| Food | 651 | 651 | 21 | 21 | 1.00 | 4.86 | 4.05 | 4.05 |
| Financial | 47 | 118 | 382 | 152 | 1.06 | 4.81 | 2.28 | 4.44 |
| CNRKB | 80 | 80 | 75 | 75 | 1.00 | 2.00 | 17.23 | 17.23 |
| Siebert | 388 | 396 | 127 | 124 | 2.39 | 3.73 | 2.86 | 2.87 |
| Biocaster | 719 | 719 | 36 | 36 | 1.00 | 8.63 | 16.19 | 16.19 |
| LUBM 1 | 30 | 30 | 572 | 572 | 1.13 | 4.83 | 3.63 | 3.63 |
| LUBM 10 | 29 | 29 | 7 153 | 7 153 | 1.14 | 5.38 | 4.31 | 4.31 |
| LUBM 50 | 27 | 27 | 40 104 | 40 104 | 1.15 | 5.56 | 4.48 | 4.48 |
| LUBM 100 | 27 | 27 | 79 765 | 79 765 | 1.15 | 5.56 | 4.48 | 4.48 |
| UOBM 1 | 3 104 | 4 705 | 8 | 5 | 3.02 | 14.18 | 7.18 | 7.35 |
| UOBM 10 | 11 453 | 17 347 | 21 | 14 | 3.34 | 15.48 | 7.58 | 7.86 |
| UOBM 50 | 25 636 | 43 283 | 48 | 28 | 3.52 | 16.29 | 7.82 | 8.14 |
| UOBM 100 | 34 992 | 59 184 | 70 | 42 | 3.59 | 16.62 | 7.91 | 8.24 |
| Robert | 81 | 130 | 5 | 3.12 | 0.24 | 22.16 | 3.50 | 3.44 |

Fig. 7

| Ontology | HermiT alone | | Abstraction Refinement | | Ratio | |
|---|---|---|---|---|---|---|
| | Time (s) | Memory (GB) | Time (s) | Memory (GB) | Time | Memory |
| Gazetteer | 421 | 1.5 | 34 | 0.5 | 8% | 35% |
| Coburn | 1583 | 1.0 | 28 | 0.3 | 2% | 25% |
| Food | 32 | 0.8 | 22 | 0.4 | 69% | 48% |
| Financial | 4 | 0.2 | 7 | 0.1 | 175% | 58% |
| CNRKB | 5 | 0.2 | 12 | 0.2 | 240% | 99% |
| Siebert | 17 | 0.4 | 11 | 0.3 | 65% | 77% |
| Biocaster | 10 | 0.3 | 13 | 0.4 | 130% | 135% |
| LUBM 1 | 4 | 0.1 | 6 | 0.2 | 150% | 146% |
| LUBM 10 | 193 | 1.1 | 26 | 0.4 | 13% | 38% |
| LUBM 50 | 4096 | 5.7 | 98 | 1.2 | 2% | 21% |
| LUBM 100 | 16954 | 11.8 | 174 | 2.6 | 1% | 22% |
| UOBM 1 | 10 | 0.4 | 21 | 0.4 | 210% | 87% |
| UOBM 10 | 337 | 2.4 | 257 | 1.0 | 76% | 42% |
| UOBM 50 | 8979 | 12.3 | 2324 | 4.3 | 26% | 35% |
| UOBM 100 | 34543 | 23.6 | 4541 | 6.5 | 13% | 27% |
| Robert | 172 | 0.5 | 247 | 0.7 | 144% | 138% |

Fig. 9

| A | R | $A_n/A$ | I | $max_A$ | $max_B$ | $log_{10}(prop_{A<B})$ | $red_{A \to B}$ |
|---|---|---|---|---|---|---|---|
| 10 | 100 | 2 | 1,000 | 100,010,001 | 220,000 | −28,346,001 | 99.56% |
| 100 | 100 | 2 | 1,000 | 100,100,001 | 400,000 | −26,932,929 | 99.20% |
| 1000 | 100 | 2 | 1,000 | 101,000,001 | 2,200,000 | −12,794,523 | 95.64% |
| 100 | 10 | 2 | 1,000 | 10,100,001 | 220,000 | −1,499,453 | 95.64% |
| 100 | 100 | 2 | 1,000 | 100,100,001 | 400,000 | −26,932,929 | 99.20% |
| 100 | 1000 | 2 | 1,000 | 1,000,100,001 | 2,200,000 | −281,260,003 | 99.56% |
| 100 | 100 | 1 | 1,000 | 100,100,001 | 300,000 | −27,732,973 | 99.40% |
| 100 | 100 | 2 | 1,000 | 100,100,001 | 400,000 | −26,932,929 | 99.20% |
| 100 | 100 | 4 | 1,000 | 100,100,001 | 600,000 | −25,332,842 | 98.80% |
| 100 | 100 | 2 | 100 | 1,010,001 | 400,00 | −63,868 | 92.08% |
| 100 | 100 | 2 | 1,000 | 100,100,001 | 400,000 | −26,932,929 | 99.20% |
| 100 | 100 | 2 | 10,000 | 10,001,000,001 | 4,000,000 | −2,970,600,813 | 99.92% |

ABSTRACTION REFINEMENT FOR SCALABLE TYPE REASONING IN ONTOLOGY-BASED DATA REPOSITORIES

RELATED APPLICATIONS

This application claims priority under 35 U.S.C. §119 to European Patent Application No. 14176027.2 filed on Jul. 7, 2014, the entire content of which is hereby incorporated by reference.

FIELD OF INVENTION

The invention relates to a new computer-implemented method and apparatus for computing the concept materialization of an ontology.

BACKGROUND OF THE INVENTION

Metadata is widely used to describe data volumes across their different structures and sources for the purpose of meaningful processing. As metadata is considered all kinds of formal description including concept and rule languages (such as UML, ORM, logic, RuleML, etc.) that express knowledge about the plurality of data elements which, at least in parts, can be mapped to an ontology language such as, but not limited to, the Resource Description Framework Schema (RDFS) or the profiles of the Web Ontology Language (OWL). Meaningful processing relates to all tasks that take entailments into account that are implied by the accompanied metadata (aka reasoning) within computation of, but not limited to, answers of type queries.

Within a typical business setting data is stored in databases and any semantic information system has to utilize some sort of reasoning to enable content-aware data processing. The reasoning systems for large volumes of data basically follow three approaches:

Query rewriting or backward-chaining approaches answer a query by compiling metadata (query-relevant knowledge) into a (typically SQL) query for execution by the database engine. This technique is commonly called ontology based data access (OBDA). A suitable metadata language that supports this approach is OWL 2 QL.

Materialization or forward-chaining techniques pre-compute all entailments upfront, independent of any queries. After pre-computation it is sufficient to evaluate queries over the materialized data to obtain all entailed results. Hence in this context, materialized data means precomputed data and materialization refers to the precomputation of all entailments. OWL 2 RL is an ontology language that is sound and complete in this respect.

Combined approaches follow a mixed strategy where some of the entailments are materialized in advance or on demand while others are triggered by queries and computed just for the purpose of a particular query.

With increasing data volumes existing technical solutions of the aforementioned approaches are unable to meet practical requirements in terms of metadata expressivity, performance, storage space, or memory. To name a few: Query rewriting is limited to rewriteable and less expressive metadata languages and requires sophisticated query-optimizations to work well in practice. Straightforward full materialization easily ends up in time and space consuming pre-processing that typically has to be repeated when data changes. Combined approaches need to be adjusted and tuned for each case of application in advance.

The present technology relates to the field of Description Logics (DL) so that common DL terminology is used throughout the description as follows: ABox (the data), refers to the aggregate of data elements called individuals, in terms of asserted or inferred concept assertions (also called types) as well as role assertions. Role assertions express a directed relationship that relates one individual (the source) with a second individual (the target) with respect to a particular role. TBox refers to the aggregate of schema axioms about concepts and roles (the metadata).

U.S. Pat. No. 7,904,401 presents a method and apparatus, including computer program products, for scalable ontology reasoning. A method of generating a summarized ontology includes, according to U.S. Pat. No. 7,904,401, loading an ontology from a store, eliminating relationships in the ontology, the eliminating relationships including an insertion of new relationships that simplify the ontology, eliminating individuals in the ontology, the eliminating individuals including insertion of new individuals to simplify the ontology, eliminating concepts in the ontology including insertion of new concepts to simplify the ontology, and generating the summarized ontology from the eliminating relationships, eliminating individuals and eliminating concepts. U.S. Pat. No. 7,904,401 does not perform materialization.

Fokoue, Kershenbaum, Ma, Schonberg, and Srinivas: "The summary ABox: Cutting ontologies down to size", in. Proc. of the 5th Int. Semantic Web Conference (ISWC 2006), Vol. 4273 LNCS, p. 343-356, Springer, 2006, presents an approach that merges similar individuals to obtain a compressed, so-called summary ABox, which is then used for (refutation-based) consistency checking. The approach is similar and closely related to the approach of U.S. Pat. No. 7,904,401. The technique is based on the observation that individuals with the same asserted types are likely to have the same entailed types. Since merging in Fokoue et al. is only based on asserted concepts, the resulting summary ABox might be inconsistent even if the original ABox is consistent w.r.t. the TBox. To remedy this, justifications, according to Kalyanpur at al: "Finding all justifications of OWL DL entailments", in. Proc. of the 6th Int. Semantic Web Conference (ISWC 2007), Vol. 4825 LNCS, p. 267-280, Springer, 2007, are used to decide which merges caused the inconsistency and to refine the summary accordingly. Justification-based refinements are also necessary for query answering since Fokoue at al. and U.S. Pat. No. 7,904,401 do not perform query answering based on materialization but perform reasoning at query time. Such computation of justifications is very resource intensive, requiring significant processing and memory resources, and furthermore slows down the process of query answering. The computation of all justifications is typically part of the exponential Reiter's search according to U.S. Pat. No. 7,904,401. For large ABoxes, such as those which are used in the evaluation section below, the calculation of justifications according to U.S. Pat. No. 7,904,401 and also Fokoue et al., despite possible optimizations, may even be impossible on ordinary computer hardware, such as the one used in the evaluation section below, due to resource shortage. It is thus desirable to avoid the creation of a possibly inconsistent summary ABox in the first place and thus also to avoid the step of computing justifications altogether.

Wandelt and Möller present in "Towards ABox modularization of semi-expressive description logics", Journal of Applied Ontology, 7(2):133-167, 2012, a technique for refutation-based instance retrieval over SHI ontologies based on modularization. As an optimization, this approach groups individuals into equivalence classes based on the asserted types of an individual, its successors, predecessors and the asserted types of the successors and predecessors. The assertions that define the equivalence class of an individual are used for finding sound entailments. For checking entailments that cannot be read-off from these assertions, it might be necessary to fall-back to (refutation-based) reasoning over the (possibly large) ABox module for the individual. This fall-back is however undesirable, since it requires in certain cases the processing on the basis of the original ABox, which would nullify the effect of possible improvements in terms of resource savings possibly achieved by the grouping of individuals.

Wandelt and Müller present in "Sound and Complete SHI Instance Retrieval for 1 Billion ABox Assertions", Workshop on Scalable Semantic Web Systems, pp. 75-89, 2011, a technique for refutation-based instance checking over SHI ontologies based on modularization. The method relies on ABox modules called individual islands that are built for each individual using a syntactical splittability check based on the TBox information. Each individual island is a subset of the original ABox that contains at least all ABox facts necessary to compute all entailed concept memberships for this individual. It is sound and complete to use the island of an individual to check all its concept memberships instead of the original ABox. However, for exhaustive concept materialization of the ABox, the islands of all individual must be built and checked separately. Therefore individual islands provide no advantage in terms of a size reduction with respect to individuals or assertions. Yet, if two or more individuals have similar (isomorphic) islands, one could apply the results of the concept materialization for the first individual to the others instead of processing the individual islands of the other individuals. Unfortunately the similarity test between individual islands, which may consist of substantial parts of the ABox, can be too computationally intensive to be practicable since it is a graph isomorphy problem for which no polynomial algorithm is known for the general case as of today. Wandelt and Möller in "Sound and Complete SHI Instance Retrieval for 1 Billion ABox Assertions" therefore defined an approximation of the individual islands called one-step nodes, grouping individuals into equivalence classes based on the asserted types of an individual, its successors, predecessors and the asserted types of the successors and predecessors. The assertions that define these equivalence classes are then used for computing sound entailments for their member individuals. However, this approximation is only complete if the one-step node is splittable, wherein splittability implies that the island of this individual is included in the one-step node, what can only be the case for very small islands. In each case where the one-step node is not splittable, the equivalence classes have to be discarded and the bigger island of each individual must be used. Moreover, the approach of Wandelt and Möller is not compatible with the use of nominals which are widely used in real-world ontologies. Individual islands and splittability depend on the TBox. As soon as a concept assertion for an individual can possibly be used to infer new assertions for second individual that is not a "neighbor", the one step node for the second individual is not splittable. Hence, the bigger the TBox, i.e. the more complex the ontology, the lower the chance that the one step node is splittable.

SUMMARY OF THE INVENTION

The presented innovation uses a compression technique called "ABox abstraction and refinement" that may significantly reduce time, memory, and computing resources for reasoning and in particular for computing and outputting the materialization of an ABox. The terms "materialized" and "materialization" in the following refer to concept materialized and concept materialization, i.e. computation of all entailed concepts of all individuals (or equivalently all instances of every concept), respectively, as given by the semantic interpretation of ontologies formally defined in the subsection on "Preliminaries" in the section "Detailed description". The terms "abstract ABox" and "compressed ABox" are used interchangeably in the following.

According to one embodiment, there is provided a computer-implemented method for computing a concept materialization of an ontology O, wherein O is a formal explicit description of concepts and roles in a domain of discourse comprising: an ABox A, referring to data elements, called individuals, in terms of asserted or inferred concept assertions, and role assertions, expressing a directed relationship that relates one individual, called source, with a second individual, called target, with respect to a particular role, and a TBox T, referring to schema axioms about concepts and roles, the computer-implemented method comprising the following steps: (1) building an ABox B, being a compressed representation of ABox A, based on equivalence classes of individuals in ABox A, wherein individuals fall into the same equivalence class if they are asserted to the same concepts and if they are the source of the same roles and if they are target of the same roles, wherein the ABox B contains for each equivalence class E a fresh individual I with the same concept assertions as the individuals in E, and for each role Rj for which the individuals in E appear as source in a role assertion for Rj, a corresponding fresh individual $I_{R}j$ and a role assertion for role Rj with I as source and $I_{R}j$ as target, and for each role Rk for which the individuals in E appear as target in a role assertion for Rk, a corresponding fresh individual $I_{R}k$ and a role assertion for role Rk with $I_{R}k$ as source and I as target; (2) materializing all entailed concept assertions of ABox B with respect to TBox T of the ontology O using ontology reasoning; (3) extending ABox A by adding, if not already included, assertions to obtain ABox A' so that ABox A' includes for all equivalence classes E: (i) concept assertions for all individuals of E corresponding to entailed concept assertions for fresh individual I in ABox B representing equivalence class E; (ii) concept assertions for all individuals in ABox A which are source respectively target of a role assertion with role R corresponding entailed concept assertions in ABox B for an individual that is source respectively target of role assertioftwith role R and an individual I in ABox B representing equivalence class E; (4) if new assertions are added by the extending in step (3) repeat from step (1), wherein ABox A should be the extended ABox A' provided by step (3); wherein the transformed ontology O' is obtained from O by replacing the original ABox A with the final extended ABox A', being a materialized version of the original input ABox A.

Thereby the fresh individuals are individuals that do not occur in the ABox A for which the abstraction is computed and the fresh individuals constitute the individuals of ABox B.

This method has the effect that materialization of the ontology can be performed without computing steps that have very high computing resource requirements such as, e.g., the computing of justifications in U.S. Pat. No. 7,904, 401 and Fokoue et al.

This method has the further effect that the utilized ontology reasoning component deals exclusively with an ontology comprising a compressed ABox and thus the reasoning requires less computing and memory resources to compute the materialization of the ABox. The amount of reduction in storage and processing requirements for the utilized ontology reasoning component due to the method according to the present invention will become apparent and are documented in the evaluation section below.

In one embodiment, the ontology O uses Description Logic DL as the formal knowledge representation language, which is preferably a Horn ALCHOI description logic fragment.

This has the effect and advantage that the description logic is very expressive thus enabling the efficient representation and reasoning over complex concepts and roles in a domain of discourse.

In one embodiment, step (2) of the method uses a normalized version T' of TBox T, wherein TBox T' is obtained by normalizing TBox T' by introducing new concepts to T as replacement for complex concept expressions in T' as well as by adding axioms to T designed to preserve the entailments of T.

Thereby, complex concept expressions are concepts defined using quantificators and roles.

The normalization of the TBox has the effect that all axioms of the normalized TBox T' have the aforementioned normalized form under which the above method for materialization of an ontology O is guaranteed to be complete, which means that the materialization includes all atomic concept assertions that are entailed by the ontology O. The completeness is guaranteed under the further assumption that the TBox of the ontology is expressed in a Horn equivalent form. The completeness proof is provided below in the section on completeness.

The Horn ALCHOI normal form required by the abstraction refinement process to guarantee completeness adds the following restrictions to the Horn ALCHOI normal form:

no existential restriction expressions are allowed in the sub-concepts of concept inclusion axioms no complex concept expression are allowed in the universal restriction expressions in the super-concepts of concept inclusion axioms.

The conversion of a Horn ALCHOI ontology to the Horn ALCHOI normal form can be achieved (for instance) by the following steps:

first each concept expression in the ontology is replaced by its negation normal form, this form being obtained by well-known transformations pushing the negations down into the sub-expressions until the negation only applies to atomic concepts, then the following transformations are applied repeatedly to all concept inclusion axioms in the ontology (including the concept inclusion axioms modified and added by these transformations) until none is applicable:

each existential restriction expression with role expression R and concept expression C in the sub-concept of an axiom is replaced by a fresh atomic concept $X_C$ and a new concept inclusion axiom stating the inclusion of concept expression C into an universal restriction with role expression inverse of R and concept expression $X_C$ is added to the ontology.

each universal restriction expression with role expression R and non-atomic concept expression D in the super-concept of an axiom is replaced by an universal restriction with role R and a fresh atomic concept $Y_D$ and a new concept inclusion axiom stating the inclusion of atomic concept $Y_D$ into concept expression D is added to the ontology.

In one embodiment, all concept assertions for concepts introduced during the normalizing are removed from the final extended ABox A' in order to obtain a materialized ABox of the original ontology with the original non-normalized TBox.

In one embodiment, the accessing and storing of individuals, concept and role assertions of ABox A and its extensions is performed by a database.

This has the effect and advantage that the main memory is available for the computation of the materialization of the compressed ABox and therefore allows the materialization of bigger ontologies with the given limited amount of computing and memory resources of ordinary computer hardware, as shown by in the evaluation section below.

In one embodiment, a computer program comprising computer program code is provided which, when being executed on a computer, enables said computer to carry out the method according to an embodiment described previously.

In one embodiment, there is provided a data structure representing an ABox B corresponding to a compressed representation of ABox A being generated by the method of computing a concept materialization of an ontology O according to one of claims 1 to 5.

In one embodiment, there is provided an apparatus for computing a concept materialization of an ontology O, wherein O is a formal explicit description of concepts and roles in a domain of discourse comprising: an ABox A, referring to data elements, called individuals, in terms of asserted or inferred concept assertions, and role assertions, expressing a directed relationship that relates one individual with a second individual with respect to a particular role, and a TBox T, referring to schema axioms about concepts and roles, the apparatus comprising: (1) means for building an abstraction, ABox B, of ABox A, being a compressed representation of ABox A, based on equivalence classes of individuals in ABox A, wherein individuals fall into the same equivalence class if they are asserted to the same concepts and if they are the source of the same roles and if they are target of the same roles, wherein the ABox B contains for each equivalence class E: a fresh individual I with the same concept assertions as the individuals in E, and for each role Rj for which the individuals in E appear as source in a role assertion for Rj, a corresponding fresh individual $I_R j$ and a role assertion for role Rj with I as source and $I_R j$ as target, and for each role Rk for which the individuals in E appear as target in a role assertion for Rk, a corresponding fresh individual $I_R k$ and a role assertion for role Rk with $I_R k$ as source and I as target; (2) means for materializing all entailed concept assertions of ABox B with respect to TBox T of the ontology O using ontology reasoning, (3) means for extending ABox A, by adding, if not already included, assertions to obtain ABox A' so that ABox A' includes for all equivalence classes E: (i) concept assertions for all individuals of E corresponding to entailed concept assertions for fresh individual I in ABox B representing equivalence class E; (ii) concept assertions for all individuals in ABox A which are source respectively target of a role assertion with role R corresponding entailed concept assertions in ABox B for an individual that is source respectively target of role assertion with role R and an individual I in ABox B representing equivalence class E; (4) means for controlling iterative refinement such that, if new assertions are added by the means for extending, the operation proceeds such that it repeats from the building of an abstraction, wherein ABox A should be the extended ABox A' provided by the means for extending; wherein the transformed ontology O' is obtained from O by replacing the original ABox A with the final extended ABox A', being a materialized version of the original input ABox A.

In one embodiment, there is provided an apparatus as described previously, further comprising means for carrying out the method described above.

DESCRIPTION OF DRAWINGS

FIG. 2 shows a table that specifies the syntax and semantics of the DL ALCHOI.

FIG. 3 shows an example ABox, TBox and the respective abstraction refinements.

FIG. 4 shows a table that specifies characteristics of the test ontologies used for evaluation.

FIG. 5 shows a table that specifies the abstraction sizes (first/last) and compression ratio of the test ontologies.

FIG. 6 shows a table that specifies type statistics for the test ontologies.

FIG. 7 shows a table that specifies runtime and memory usage of materialization with abstraction refinement in comparison to the original ABox.

FIG. 9 shows a table that specifies probabilities of eventual non-reduction and average reduction of the size for random ABoxes over a given vocabulary.

DETAILED DESCRIPTION

Overview

The invention provides methods and an apparatus for building and refining a smaller, compressed representation of an ABox, called abstract ABox, for the purpose of efficient computation of all entailed concepts of all individuals. This computation service is typically called materialization or realization and is key for efficient (conjunctive) query answering.

Figure 8A:
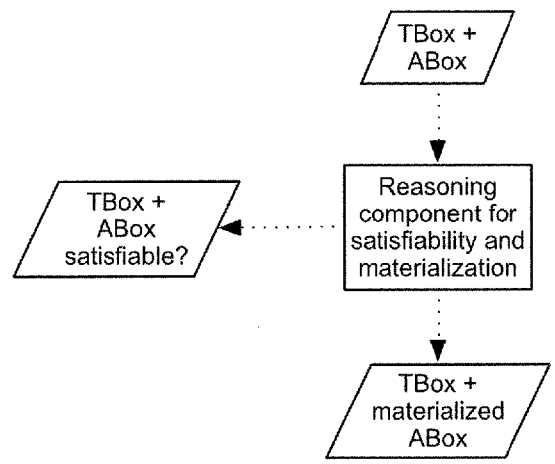
FIG. 8A shows a flow diagram for ontology materialization according to the state of the art.

FIG. 8A shows an overview flowchart for computing materialization of an ontology according to the state of the art using a reasoning component that also verifies if the ontology is satisfiable. The reasoning component requires significant processing and storage resources that typically grow more than linearly with the size of the input ABox. Thus for large ABoxes, the materialization procedure according to the state of the art as shown in FIG. 8A may not succeed on ordinary computer hardware, such as the one used in the evaluation section below.

Figure 8B:
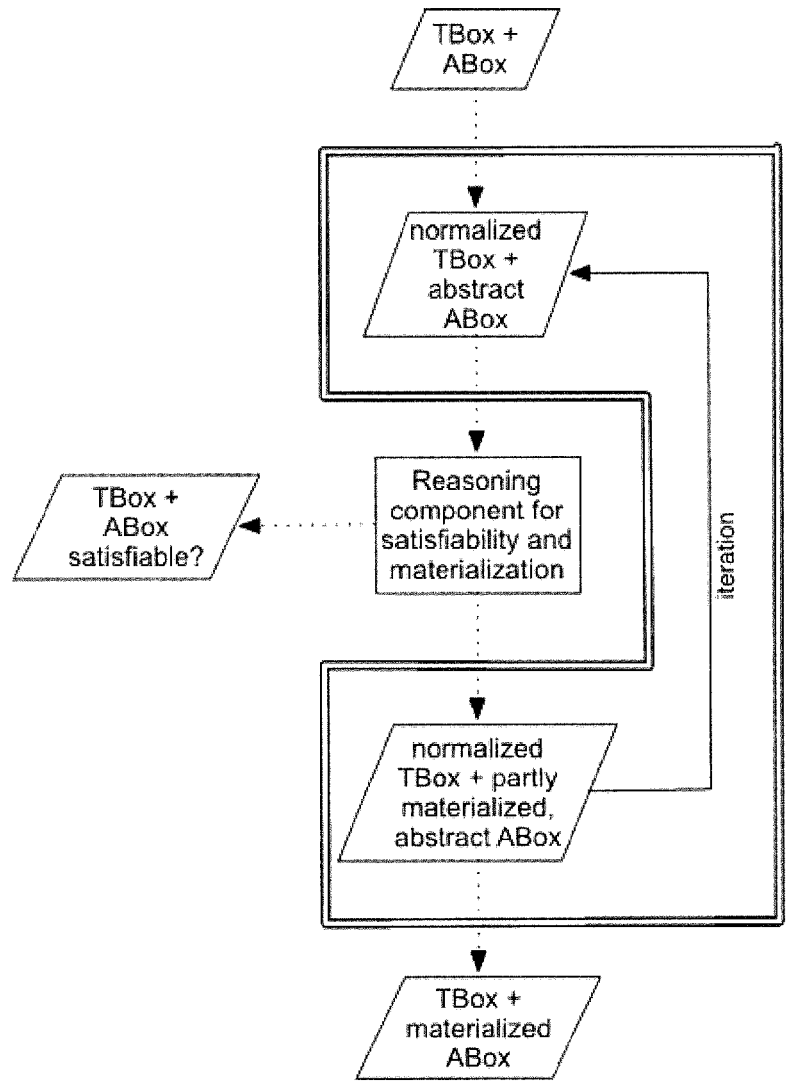
FIG. 8B shows a flow diagram for ontology materialization using abstraction and an iterative refinement scheme according to the present invention.

FIG. 8B shows an overview flowchart for computing materialization of an ontology according to the present invention. As will be discussed in more detail below, an abstraction of input ABox and a normalized form of the input TBox are computed and materialization is performed based on this abstraction, whereby the abstraction is refined and the materialization is completed in a stepwise iterative process. Thereby, the reasoning component used to verify satisfiability and to compute the materialization may be the same as the one used in the state of the art according to FIG. 8A, and may be a standard reasoner. Nevertheless, as will be discussed in detail below, the materialization procedure according to FIG. 8B can much more efficient than the procedure according to FIG. 8A, so that materialization may be computed even for large ABoxes on ordinary computer hardware, such as the one used in the evaluation section below.

Figure 1:
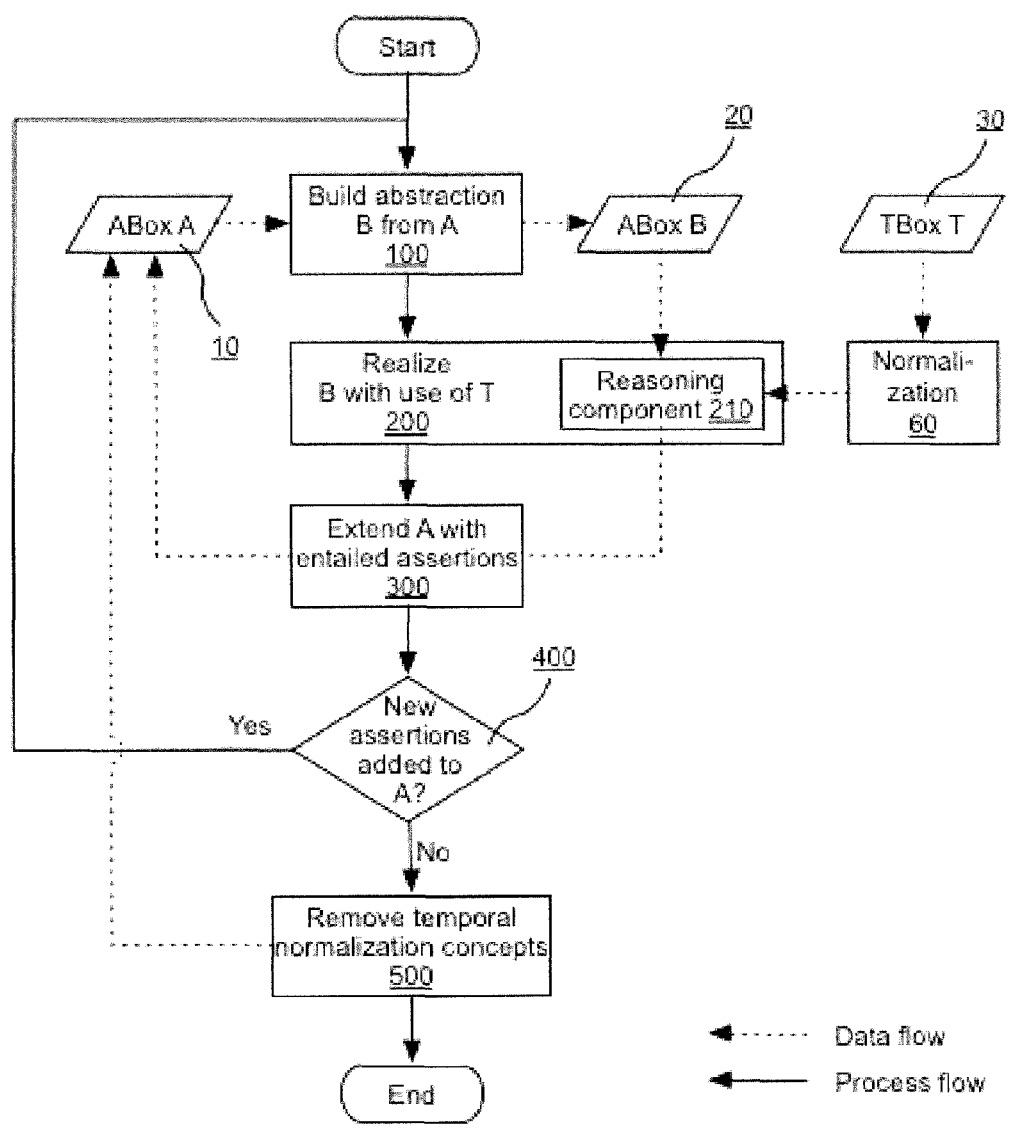
FIG. 1 shows a flow diagram of data and processing for abstraction refinement.

FIG. 1 shows a flowchart with components and the data and processing flows for computing a materialization based on abstraction refinement of an original ontology O, comprising an ABox A and a TBox T, according to an embodiment of the present invention.

FIG. 1 shows an ABox processing component 10 for accessing and storing individuals, concept and role assertions of an input ABox A and its extensions. Component 10 may be implemented using a database which has, due to a potentially large number of individuals, concept and role assertions, a large size such that it may not be fully stored in main memory. The storage requirements are typically linear in the number of concepts and roles of individuals, which means that doubling the number of concepts and roles of individuals will also double the amount of storage required in ABox component 10.

Furthermore, step 100 is provided for building of an abstract representation B of an ABox A based on the equivalence classes defined by the individuals in A that are asserted to the same concepts and source of the same roles and target of the same roles. B contains for each equivalence class E in A a fresh individual I asserted to exactly the same concepts as the individuals in E and, for each role for which the individuals in E are asserted as source (resp. target), a role assertion with I as source (resp. target) and a further fresh individual as target (resp. source). Step 100 can be understood as a compression, where ABox A is an original ABox and abstract ABox B is the compressed version thereof. For this reason, the abstract ABox B will be referred to also as compressed ABox B in the following. As will be apparent later in the description, the reasoning on the compressed ABox B can be more efficient than reasoning on the original ABox A due to the smaller size and also due to the simpler structure of ABox B.

Furthermore, a component 20 for storing and accessing individuals, concept and role assertions of an abstract ABox B is given, wherein this component, due to its reduced size compared to the ABox component 10, may typically be stored in an in-memory data structure, which typically allows much faster data access than a database that is not fully stored in memory. The latency of data access to an ABox component is very critical for efficient reasoning and in particular materialization of that ABox.

In some embodiments, a normalization step 60 provides the building of a normalized version of a TBox T, being stored in a TBox component 30. The normalization replaces particular complex concept expressions in the original axioms and may add new simple axioms designed to preserve the original entailments. This normalization step can be required to ensure the completeness of the realization using abstraction refinement. A proof that the abstraction refinement according to the present invention is complete is given further below in the section on completeness.

In some embodiments, a step 200 provides computing the entailed concepts of the abstract ABox B wrt. the normalized TBox utilizing ontology reasoning 210. The ontology reasoning 210 can be implemented using any system which is sound and complete for the description language used to express the ABox B and the normalized TBox. In particular, the reasoning component, also called reasoner, used for reasoning on the compressed ABox B can be the same as the reasoner used for reasoning on the original ABox A, which in turn can be any standard reasoning system with the aforementioned properties. It should be mentioned, that the application of a reasoning component on an ontology typically incurs memory requirements that may be significantly higher than the size of the input ontology, in particular the input ABox. It is not uncommon that, although an input ABox A may fit into main memory, reasoning over said ABox A may be impossible due to additional memory requirements of the reasoner, wherein the additional memory requirements may in some cases be multiple times the size of the input ontology. Thus, in the present invention, the compression, i.e. size reduction, of an ABox A to its compressed ABox B may not only have the effect that the ABox B may be stored entirely in main memory but also that reasoning over the ontology with compressed ABox B is possible in main memory, when it was not possible for the ontology with original ABox A.

In some embodiments, a step 300 provides the extension of the ABox A as follows: (i) the entailed concept assertions for an individual I in ABox B representing an equivalence class E result in the same concept assertions for all individuals of E in ABox A and (ii) the entailed concept assertions in ABox B for an individual that is source (resp. target) of a role assertion with an individual I in ABox B representing an equivalence class E of ABox A result in the same concept assertions for all individuals in ABox A which are source (resp. target) of a similar role assertion with an individual of E. Concepts include original concepts of TBox T as well as fresh concepts introduced by the normalization. Step 300 can be understood as a decompression step as follows: The results of the ontology reasoning step, which are e.g. the entailed concept assertions in ABox B, are fed back and integrated into the original ABox A as described in steps (i) and (ii) above, thus creating a fully materialized ABox A in a stepwise iterative procedure which is further described in the following.

The terminology "compression" and "decompression" is used to emphasize the size reduction achieved when creating an abstract ABox B from an original ABox A. The terminology does however not mean the compressed ABox B may be used as a full replacement of ABox A as perhaps in lossless compression procedures. This is not the case here, since ABox A is kept and enhanced (step 300) and the abstract ABox B is mainly used to facilitate efficient reasoning and to efficiently compute the materialization of original ABox A.

In some embodiment, it is checked whether new assertions have been added to ABox A in the step performed by step 300 and a decision is taken to repeat the abstraction building by restarting from the step 200 if new assertions have been added. Otherwise, a fixed point in the iterative procedure is reached and the extended ABox A is a fully materialized version of the original input ABox A wrt. the normalized TBox.

This iterative procedure leads to the following results: The original ABox A is materialized in iterative steps as described in step 200 and extended to include new concept assertions as described in step 300.

In some embodiments, a step 500 is provided which removes all concept assertions of concepts introduced by the normalization 60. After removal the extended ABox A is a fully materialized version of the original input ABox A wrt. original input TBox T.

An important property of the present invention is that the materialized ABox is complete wrt. OWL 2 direct semantics for all parts of metadata descriptions that can be mapped into the DL Horn ALCHOI. The proof of this property is provided below.

Another important property of the present invention is that the number of individuals in the abstraction is always bounded exponentially in the number of different concepts and roles and linearly in the size of the input ABox; hence the abstraction is relatively small when the number of individuals is much larger than the number of concepts.

The approach to computing materialization in data repositories that utilize ontologies as metadata description can be extended to more expressive description logic fragments that include, for instance, role chains, functional roles, equivalence or distinctness of individuals, etc.

Preliminaries

First, the syntax and semantics of the Description Logic (DL) ALCHOI is defined, which is the ontology language considered for presenting and illustrating the examples given in the following description. It should be noted that the present invention is not limited to the Horn ALCHOI description logic fragment and that the invention may be practiced in the context of other description logic languages as well. The syntax of ALCHOI is defined using a vocabulary (signature) consisting of countably infinite disjoint sets $N_C$ of concept names, $N_O$ of nominals, $N_R$ of role names, and $N_I$ of individual names. Note that concepts are called classes and roles are called properties in OWL. Complex concepts and axioms are defined recursively in FIG. 2. An ontology O is a finite set of axioms often written as O=A∪T where A is an ABox consisting of the concept and role assertions in O and T a TBox consisting of the concept and role inclusions in O. The terms con(O), rol(O), ind(O) are used for the sets of concept names, role names, and individual names occurring in O, respectively.

An interpretation $I=(\Delta^I, \cdot^I)$ consists of a non-empty set $\Delta^I$, the domain of I, and an interpretation function $\cdot^I$ that assigns to each $A \in N_C$ a subset $A^I \subseteq \Delta^I$, to each $o \in N_O$ a singleton subset $o^I \subseteq \Delta^I$, $\|i^I\|=1$, to each $R \in N_R$ a binary relation $R^I \subseteq \Delta^I \times \Delta^I$, and to each $a \in N_I$ an element $a^I \subseteq \Delta^I$. This assignment is extended to complex concepts as shown in FIG. 2. I satisfies an axiom α (written I⊨α) if the corresponding condition in FIG. 2 holds. I is a model of an ontology O (written I⊨O) if I satisfies all axioms in O. O is consistent if O has a model. O entails an axiom α (written O⊨α), if every model of O satisfies α. O is concept materialized if A(a)∈O whenever O⊨A(a), A∈con(O) and a∈ind(O);

Some definitions do not present nominals as primitive symbols, but use a special nominal constructor {a} with individual a (in this case, $\{a\}^I=\{a^I\}$). Such ontologies can be easily converted to the above described representation by renaming every nominal a with the corresponding nominal symbol $o_a$ and adding a concept assertion $o_a$ (a). This transformation is a conservative extension, i.e., it preserves all original entailments.

Bi-homomorphic Individuals and Individual Types

In order to (syntactically) characterize individuals that yield the same consequences, structure-preserving transformations of ABoxes are described in the following.

Definition 1

Let A and B be two ABoxes and h: ind(A)→ind(B) a mapping from the individuals in A to individuals in B. h is extended to axioms in a straightforward way: h(C(a))=C(h(a)), h(R(a,b))=R(h(a),h(b)), and h(α)=α for other axioms α.

h is a homomorphism (from A to B) if h(A) ⊆ B. An individual a in A is homomorphic to an individual b in B if there exists a homomorphism h from A to B such that h(a)=b; in addition, if b is homomorphic to a, then a and b are bi-homomorphic.

Example 1

Consider the ABox A={R (a, a), R (a, b), R (b,b)}. Then the mappings $h_1=\{a \mapsto b, b \mapsto b\}$ and $h_2=\{a \mapsto a, b \mapsto a\}$ are homomorphisms from A to A. Since $h_1(a)$=b and $h_2(b)$=a, the individuals a and b are bi-homomorphic. Note that there is no isomorphism h from A to A (a bijective homomorphism such that its inverse is also a homomorphism) such that h(a)=b or h(b)=a.

It is easy to show that entailed axioms are preserved under homomorphisms between ABoxes. In particular, bi-homomorphic individuals are instances of the same concepts.

Lemma 1

Let h: ind(A)→ind(B) be a homomorphism between ABoxes A and B. Then for every TBox T and every axiom α,A∪T⊨ α implies B∪T⊨ h(α).

Proof

Suppose that A∪T⊨ α. Then h(A∪T)⊨ =h(α). Since h(A∪T)=h(A)∪h(T)=h(A)∪T⊆B∪T, by monotonicity we obtain B∪T⊨ h(α).

Corollary 1

If individuals a and b in an ABox A are bi-homomorphic, then, for every TBox T and every concept C,A∪T⊨ C(a) holds if and only if A∪T⊨ C(b).

If an ABox does not have role assertions, the bi-homomorphic individuals in an ABox are exactly those that have the same concepts in the assertions. Hence, bi-homomorphic individuals can be identified by just looking at their types— the set of concepts of which the individual is an (asserted) instance. Clearly, the number of different types, and hence the maximal number of individuals that are not bi-homomorphic to each other is at most exponential in the number of different concepts used in the ABox. With role assertions, however, it cannot be determined whether individuals are bi-homomorphic by just looking at their assertions. In fact, the number of non-bi-homomorphic individuals can be arbitrary large even if just one role is used in role assertions and there are no concept assertions.

Example 2

Consider an ABox $A=\{R(a_{i-1}, a_i) | 1 < i \le n\}$. It can be easily shown that the only homomorphism h: ind(A)→ind(A) from A to A is the identity $h=\{a_i \mapsto a_i | 1 \le i \le n\}$, i.e., no different individuals in A are bi-homomorphic to each other. In fact, it is easy to find a TBox T with which all individuals in A entail different sets of assertions. Indeed, take $T=\{T \sqsubseteq A_1, A_{i-1} \sqsubseteq \forall R.A_i, 1 < i \le n\}$. Then $A \cup T \vDash A_j(a_i)$ holds if and only if $1 \le j \le i \le n$.

From Example 2 one can see that with many role assertions, an ABox is less likely to have many bi-homomorphic individuals. Note from Corollary 1 that if two individuals are bi-homomorphic, then they entail the same assertions w.r.t. every TBox. Clearly, this property is too strong for the purpose at hand, as it is necessary to deal with just one given TBox. It can be that many (non-bi-homomorphic) individuals are still materialized in the same way, because the number of different concept names used in the TBox is bounded. To take this into account, a different approach is proposed as follows: Instead of partitioning the individuals in the ABox in equivalence classes according to the isomorphism relation (which might be already too fine-grained for the TBox), one starts with an approximation to this relation, which makes more individuals equivalent. As soon as entailed assertions are obtained using a reasoner that distinguish elements within the same equivalence class, this approximation can be refined and the process is repeated until the fixpoint is reached.

Definition 2

Let A be an ABox. The type of an individual a (w.r.t. A) is a triple $tp(a)=(tp_\downarrow(a), tp_\rightarrow(a), tp_\leftarrow(a))$ where $tp_\downarrow(a)=\{C | C(a) \in A\}$, $tp_\rightarrow(a)=\{R | \exists b: R(a, b) \in A\}$, and $tp_\leftarrow(a)=\{S | \exists c: S(c, a) \in A\}$. Such type is also called abstract type.

Intuitively, the type of an individual is obtained by considering all assertions in which this individual occurs in the ABox, and ignoring all other individuals in these assertions. Note that bi-homomorphic individuals have the same types, so the relation between individuals of the same types is an approximation to the isomorphism relation.

Abstraction of an ABox

If the ABox is compressed by simply merging all individuals with the same type into one, unexpected entailments can be obtained, even if all individuals are bi-homomorphic. This is problematic, since it may lead to incorrect conclusions as illustrated on the following example:

Example 3

Consider the following ABox A={R(a, b), R(b, a)}. Clearly, a and b are bi-homomorphic in A. Let B={R(a, a)} be obtained from A by replacing individual b with a, and let T={T⊑B⊔C, ∃R.B⊑C}. This TBox specifies that all individuals belong to concept B or concept C (first assertion) and that all individuals that have an R-successor in B belong to concept C (second assertion). It is easy to check that B∪T ⊨ C(a), but A∪T⊭ C(a). This result is unexpected in the sense that C(a) is entailed by the new ontology B∪T but not by the original ontology A∪T.

To resolve this problem, one could follow the summary ABox approach according to Fokoue at al. or U.S. Pat. No. 7,904,401 B2 and compute justifications for entailed assertions to determine which individuals should not be merged. As described above, such procedure may incur very high requirements on computational and memory resources in the hardware, especially for large ABoxes. The present technology however is different and has been designed due to limitations of hardware resources in ordinary computer hardware, such as the one used in the evaluation section below. The present technology has been designed with the goal in mind to avoid such computationally expensive and memory intense operations. Hence, instead of merging all individuals with the same type into one, every individual type in the abstract ABox is realized. With abstract ABoxes defined as follows, one can guarantee that assertions that are entailed for the representative individuals also hold for the original individuals, so that the problem illustrated by Example 3 above does not arise any longer.

Definition 3 (ABox Abstraction)

The abstraction of an ABox A is an ABox $B=\bigcup_{a\in ind(A)} B_{tp(a)}$, where for each type $tp=(tp_\downarrow, tp_\rightarrow, tp_\leftarrow)$, $B_{tp}$ is defined as $B_{tp}=\{C(x_{tp})|C\in tp_\downarrow\} \cup \{R(x_{tp}, y_{tp}^R)|R\in tp_\rightarrow\} \cup \{S(z_{tp}^S, x_{tp}) |S\in tp_\leftarrow\}$, where $x_{tp}$, $y_{tp}^R$, and $z_{tp}^S$ are fresh distinguished abstract individuals.

Intuitively, the abstraction of an ABox is a disjoint union of small ABoxes witnessing each individual type realized in the ABox.

Example 4

Consider the ABox A={A(a), A(d), R(a, b), R(a, e), R(b, c), R(b, e), R(c, a), R(d, c), R(e, d)}. It holds $tp(b)=tp(c)=tp(e)=tp_1=(\emptyset, \{R\}, \{R\})$ and $tp(a)=tp(d)=tp_2=(\{A\}, \{R\}, \{R\})$. The abstraction of A is $B=B_{tp_1}\cup B_{tp_2}$, with $B_{tp_1}=\{R(x_{tp_1}, y_{tp_1}^R), R(z_{tp_1}^R, x_{tp_1})\}$, $B_{tp_2}=\{A(x_{tp_2}), R(x_{tp_2}), R(x_{tp_2}, y_{tp_2}^R), R(z_{tp_2}^R, y_{tp_2}), R(z_{tp_2}^R, x_{tp_2})\}$.

The following lemma shows the soundness of concept assertions derived from the abstraction.

Lemma 2

Let A be an ABox, B its abstraction, and T a TBox. Then, for every type $tp=(tp_\downarrow, tp_\rightarrow, tp_\leftarrow)$, every $a \in ind(A)$ with $tp(a)=tp$ w.r.t. A, and every concept C:
1. $B\cup T \models C(x_{tp})$ implies $A\cup T \models C(a)$,
2. $B\cup T \models C(y_{tp}^R)$ and $R(a,b)\in A$ implies $A\cup T \models C(b)$, and
3. $B\cup T \models C(z_{tp}^S)$ and $S(c, a)\in A$ implies $A\cup T \models C(c)$.

Proof

Consider all mappings h: ind(B)→ind(A) such that:

$h(x_{tp})=\{z\in ind(A)|tp(a)=tp\}$ $h(y_{tp}^R)=\{b|R(h(x_{tp}), b)\in A\}$ $h(z_{tp}^S)=\{c|S(c,h(x_{tp}))\in A\}$.

Clearly, $h(B)\subseteq A$ for every such mapping h. Furthermore, for every $a\in ind(A)$, every $R(a, b)\in A$ and every $S(a, b)\in A$, there exists h with $h(x_{tp})=a$, $h(y_{tp}^R)=b$, and $h(z_{tp}^S)=c$ for $tp=tp(a)$. Hence, claims (1)-(3) follow by Lemma 1.

Abstraction Refinement

Note that the individuals from an ABox A may correspond to several abstract individuals in the ABox abstraction B: each individual a corresponds to the abstract individual $x_{tp}$ for tp=tp(a). In addition, if $R(b,a)\in A$ or $S(a,b)\in A$ for some individual b, then b also corresponds to $y_{tp}^R$ and $z_{tp}^S$ respectively for tp=tp(b). The additional individuals $y_{tp}^R$ and $z_{tp}^S$ are introduced intentionally to refine the initial abstraction when new assertions of abstract individuals are derived, which in turn, can be used to derive new assertions of individuals in A. Specifically, it can be assumed that all entailed atomic assertions have been materialized for the abstract ABox B w.r.t. the TBox using a reasoner. The computation of the reasoner while performing the materialization can be particularly efficient, since the materialization computed by the reasoner occurs over fresh individuals corresponding to abstractions, which each may stand for multiple original individuals. By handling a single fresh individual, the reasoner thus performs work that would have otherwise, i.e. without the abstraction, have to be done multiple times for each original individual. The savings enabled by the abstraction may even be more than the reduction in the amount of individuals achieved by the abstraction, since the computational complexity of a reasoner is typically super-linear in the amount of individuals, concepts, and rules to reason about.

Moreover, the compressed ABox consists by construction of small disconnected partitions (one for each equivalence class). When considered as a graph, each partition has a star-like structure with the individual representing the equivalence class in the center and incoming (respectively outgoing) edges that are labelled with roles that are pairwise distinct. In addition to the aforementioned size reduction, these disconnected simple structures limit the possibilities of inference propagation and thus reduces the complexity of the task of the reasoning component.

In the worst case of very heterogeneous individuals of an ABox, the compressed ABox may be larger (in terms of the number of individuals) than the original ABox. As with almost all compression techniques they become more effective the more homogeneous their input. As an example, data compression following Run-Length-Encoding, RLE, which is widely known as highly effective compression technique, and which is for example described in U.S. Pat. No. 4,207,599, may cause an expansion in data size in the worst case scenario, which is rarely encountered in practice. In the real world the number of concepts and roles is much smaller than the number of individuals which restricts the heterogeneity of the ABox and leads to very good compression rates, as demonstrated in the section on implementation and evaluation below. By Lemma 2, the corresponding assertions must also be entailed in the original ABox A. In particular, by case (1), the new assertions computed for the individual $x_{tp}$, also hold for every individual a in A with tp(a)=tp. If all such assertions are added to the original ABox A, these individuals would still have the same types, so even by building a new abstraction for the extended ABox, one would not derive new assertions for the abstraction. On the other hand, if one adds the new assertion according to cases (2) and (3) of Lemma 2, different assertions may be obtained for individuals that previously had the same types. Indeed, if $R(a,b)\in A$, and a new assertion A(b) has been derived using case (2) of the lemma, then it is not necessary that a similar assertion A(b') will be derived for every b' with tp(b')=tp(b), because it is not necessarily the case that there exists R (a',b')∈A with tp(a')=tp(a), for which this case also applies. Hence, adding the newly derived assertions using Lemma 2 may refine the types of the original individuals and, in turn, result in a new abstraction, for which new assertions can be derived once again.

The above suggests the following materialization procedure based on abstraction refinement. Given an ontology O=A∪T the procedure is:
1. Build an abstraction B of A according to Definition 3.
2. Materialize B∪T using a reasoner.
3. Extend A with the newly derived assertions according to Lemma 2.
4. Repeat from Step 2 in case new assertions have been added to A in Step 3.

In order to efficiently extend A with newly derived assertions (Step 2) in a straightforward way, the individuals of each type are memorized by maintaining a data structure that keeps reference for each type tp to all of its individuals tp(a) in A when building the abstraction B. With such kind of reference, individual updates in A of case (1) in Lemma 2 are done while iterating over the individual references of a type. Note however, this is for efficiency only since one can alternatively recompute the types of each individual in A each time before extending A as part of Step 3. Updates caused by the cases (2) and (3) of Lemma 2 require a two step approach. First the respective individuals a are obtained by direct type reference followed by a lookup of the respective role successors/predecessors (referred to as b resp. c in Lemma 2) in A for an update.

Example 5 (Example 4 Continued)

Let $A_I$ be the ABox A from Example 4 and T={A⊑∀R. B, B⊑∀R⁻. A} a TBox. Let $B_I$ be the abstraction A of $A_I$=A computed in Example 4 (see FIG. 3). By materializing the concepts in $B_I$ w.r.t. T one obtains $B(y_{tp_2}^R)$, from which $A_{II}=A_I\cup\{B(b), B(e), B(c)\}$ is obtained using Lemma 2. Recomputing the types of individuals in $A_{II}$ yields tp(b)=tp(c)=tp(e)=$tp_3$=({B}, {R}, {R}), while the types of a and d remain unchanged. The abstraction of $A_{II}$ is thus $B_{II}=B_{tp_2}\cup B_{tp_3}$, where $B_{tp_3}\{B(x_{tp_3}), R(x_{tp_3}, y_{tp_3}^R), R(z_{tp_3}^R, x_{tp_3})\}$. By materializing the concepts in $B_{II}$, one obtains $A(z_{tp_3}^R)$, from which $A_{III}=A_{II}\cup\{A(b)\}$ is obtained. Again, the types of individuals in $A_{III}$ are recomputed, which gives tp(b)=$tp_4$=({A, B}, {R}, {R}), while the types of the other individuals do not change. The abstraction of $A_{III}$ is thus $B_{III}=B_{tp_2}\cup B_{tp_3}\cup B_{tp_4}$, where $B_{tp_4}=\{A(x_{tp_4}), B(x_{tp_4}), R(x_{tp_4}, y_{tp_4}^R), R(z_{tp_4}^R, x_{tp_4})\}$. Materializing the concepts in $B_{III}$ yields $B(y_{tp_4}^R)$ and $A(z_{tp_4}^R)$, which correspond to B(c), B(e), and A(a). However, those assertions already exist in $A_{III}$, so the procedure terminates.

Example 5 illustrates an interesting case where concept assertions are propagated back and forth via role assertions.

FIG. 3 shows the abstractions I-Ill produced in Example 5. Each abstraction consists of the ABoxes corresponding to the four types ($tp_1$ to $tp_4$). The inferred assertions are indicated with a "+" sign and are added to the corresponding original individuals shown in each column. The materialized assertions in the original ABox at the upper left of FIG. 3 are labeled with the first iteration in which they appear. For example, A(I) refers to the assertions of A(a) and A(d) of the first abstraction as a consequence of the given ABox of Example 4. A consequence of the first reasoning step the original ABox will be extended with B(b) in the second interation as well as abstraction. While the individuals of type $tp_2$ remain constant throughout the refinement process, those of $tp_1$ will split up into $tp_3$ and $tp_4$ in the third abstraction step.

The abstraction refinement procedure terminates since after every iteration except the last one, new atomic assertions must be added to A, and there is a bounded number of such assertions. Specifically, the number of iterations is at most $\|ind(O)\|\times\|con(O)\|$. The number of realized individual types in every ABox A, and hence the size of every abstract ABox B, is at most exponential in the number of different concepts and roles in O.

One of the differences between the present technology and the teachings of Wandelt and Möller is the above process of iterative refinements for equivalence classes. Wandelt and Möller do not describe such iterative refinement but instead propose to fall back to refutation-based reasoning over the possibly large original ABox. Hence in such case, the approach of Wandelt and Möller does not result in any efficiency gain.

The refinement in the present invention is based on semantic criteria, i.e., in the refinement process, an equivalence class is refined only when individuals are semantically distinguishable, which is determined by a reasoner. The refinement may occur, as described here within, in several iterative steps. In contrast, Wandelt and Möller, apart from not having a refinement step altogether, perform the aggregation of individuals to modules only on the basis of syntactic criteria. For example Wandelt and Moller differentiate, when building abstractions, possibly different types of individuals in successor or predecessors roles when determining equivalence classes of individuals. This is not done by the approach according to the present invention. Thus, it could occur that Wandelt and Möller may not combine two individuals into the same abstraction due to some syntactic difference in the occurrence of the individual in concepts and assertions, whereas the approach according to the present invention would at first combine these individuals in the same class and leave these individuals in the same equivalence class if a reasoner cannot distinguish the two on a semantic basis. Thus, the approach according to the present invention may lead to a higher compression rate for the abstract ABox, with the effect that the storage and processing requirements can be reduced.

Implementation and Evaluation

The procedure sketched in the preceeding section has been implemented in Java. The system relies on a graph database to store the ABoxes and uses an external OWL reasoner for materializing the abstractions.

It can be shown that in typical ontologies with large ABoxes at least within the ALCHOI fragment the number of realized types of the concept materialized ontologies and, consequently, the size of the abstract ABoxes is small and pays off in terms of materialization runtime and resource consumption. Furthermore, it has been analyzed whether it is indeed the case that real-world ontologies have moderately nesting definitions that do not require many refinement steps, where a refinement step is the process of refining the individual types.

For the evaluation ontologies with large ABoxes have been used. FIG. 4 provides relevant metrics for the test ontologies. The statistics show the number of atomic concepts in the ontology (#A and # $A_N$ for the normalized ontology), roles (#R), in dividuals (#I), role (#R(a,b)) and concept (#A(a)) assertions, and the number of concept assertions inferred by the system.

Gazetteer is from the NCBO BioPortal, Coburn is a large bio ontology from the Phenoscape project. Biocaster is the ontology about public health. CNRKB is collected from the Semantic Web portal dedicated to ontology design patterns. LUBM and UOBM refer to the Lehigh University Benchmark and the University Ontology Benchmark. LUBM n (UOBM n) denotes the data set for n universities. Robert is the family ontology of Robert Stevens, which is artificially created to test all features of OWL 2 DL. It has a sophisticated TBox as well as a very diverse and highly connected but small ABox, which is hard for the abstraction-refinement procedure. Although the proposed approach does not target this kind of ontology, it deliberately serves as a worst case example. Other ontologies are collected from various sources, e.g. Financial is from the SEMINTEC project, Food is from a project by the Food and Agriculture Organization. Gazetteer is genuinely within Horn ALEO and the remaining ontologies have been converted to Horn ALCHOI by elimination of not supported axioms. Note that the increase of normalized concepts ($A_N$) in comparison to the original concepts (A) in FIG. 4 is a rough indicator of TBox complexity, which adds extra workload to reasoners.

FIG. 5 and FIG. 6 show the results of computing and iteratively refining the abstract ABoxes until the fixpoint. The second column in FIG. 5 shows the number of refinement steps. The third and fourth (fifth and sixth) columns show the number of individuals (assertions) in the first and last abstraction, respectively, while the last four columns show the according relative reduction in percent compared to the original ABoxes. FIG. 6 shows the type statistics, i.e. the number of types and the average number of individuals, concept names, and property names per type.

In general, the abstract ABoxes are significantly smaller than the original ones and the ontologies can be materialized with few refinement steps except for the Robert ontology. For ontologies with simple TBoxes, which contain mostly atomic concept inclusions, domains and ranges for roles, and conjunctions, only one refinement step is required. This is the case since any concept assertion derived for a successor or predecessor of an abstract individual is also derived for the individual itself. LUBM and UOBM additionally contain universal quantifications, e.g. Department $\sqsubseteq \forall$headOf$^-$.Chair (rewritten from $\exists$headOf.Department$\sqsubseteq$Chair) but these axioms do not create long propagations of concept assertions over roles. For LUBM, many individuals have similar types and can be grouped into equivalence classes. This results in an extremely good compression with abstractions of nearly constant size for arbitrarily many LUBM universities. For instance, the final abstractions are just 0.38% (for LUBM 1) and 0.003% (for LUBM 100) of the size of the original ABox. This and the fact that no refinement is needed (i.e. concepts are not propagated over chains of successors or predecessors) also explains that other related approaches like SHER and Wandelt's and Moller's approach show a very good performance for in particular LUBM. UOBM, in contrast, also contains nominals and the individuals are more connected than in LUBM. Thus, UOBM requires one more refinement step compared to LUBM. For the Robert ontology, not surprisingly, the abstract ABoxes are even larger than the original ABox. In this ontology, individuals are intendedly defined to be distinguished, e.g. each individual represents a concrete person in Robert's family. Therefore, there are not many individuals of the same asserted types. On the other hand, because of complex and long nested concept definitions in the TBox, e.g. ThirdCousin≡Person$\sqcap\exists$hasParent.($\exists$hasParent.(Person$\sqcap\exists$hasParent.Person$\sqcap\exists$isSiblingOf(Person$\sqcap\exists$isParentOf.(Person$\sqcap\exists$isParentOf.(Person$\sqcap\exists$isParentOf.Person))))) the procedure requires six refinement steps for materialization.

The qualitative performance evaluation confirms the correlation between the size of abstract ABoxes and the total time for the materialization. For an absolute rating the respective materialization times of the original ABoxes has been compared with the overall runtime of the prototypical system using the well-known, Java-based OWL 2 reasoner HermiT (http://www.hermit-reasoner.com) for the original ABoxes as well as external reasoning component (cf. reasoning component 210 in FIG. 1). The tests were run on an Intel Xeon E5-2440 6 cores Linux system and a maximum of 40 GB RAM per run. FIG. 7 shows the results in terms of runtime and allocated memory of (i) HermiT materializing the original ABox and (ii) the abstraction refinement using HermiT as external reasoner. Memory consumption is given as allocated by the respective overall system within the Java Virtual Machine at the end of a run. FIG. 7 also depicts the respective ratios of runtime and memory between HermiT and abstraction refinement. It shows that the size of the abstraction is a reasonable indicator also for savings in runtime as well as memory consumption for ontologies that exceed a certain size as well as complexity. It does not provide any performance gain for ontologies that are small, simple and therefore easy to handle such as Financial, CNRKB, Biocaster, and LUBM/UOBM 1 which are materialized with HermiT in less than 10 seconds. In contrast, runtime and memory consumption is significantly better for Gazeteer, Coburn as well as LUBM and UOBM of size 10 and larger. The Robert ontology, as expected from the abstraction statistics, shows a degradation in runtime (4 to 8 times) and RAM usage (up to 2 times) over the abstractions.

Completeness

Lemma 2 guarantees that at every point of the iteration, the abstraction refinement procedure adds only entailed assertions to the ABox A. In other words, the procedure is sound. However, in the general case the described procedure is not complete, i.e., does not compute all entailed atomic assertions, as demonstrated by the following example.

Example 6

Considering the ABox A={A(a), R(a, b), B(b)} and the TBox T={B$\sqsubseteq$ C$\sqcap$D, $\exists$R.C$\sqsubseteq$C, A$\sqcap$C$\sqsubseteq\forall$R.D}. It holds that A$\cup$T|=D(b). Computing the materialization using abstraction provides tp(a)=({A}, {R}, $\emptyset$) and tp(b)=({B}, $\emptyset$, {R}). Therefore B=B$_{tp(a)}\sqcap$B$_{tp(b)}$, where B$_{tp(a)}$={A(x$_{tp(a)}$), R(x$_{tp(a)}$, y$_{tp(a)}^R$)} and B$_{tp(b)}${B(X$_{tp(b)}$), R(y$_{tp(b)}^R$, x$_{tp(b)}$)}. B$\cup$T does not entail any new atomic concept assertions. Hence, the procedure terminates after the first iteration without producing the entailment A$\cup$T|=D(b).

The primary reason why the method does not work in this example is that the abstraction breaks the ABox into disconnected parts, which cannot communicate the non-deterministic choices, e.g., for the disjunction C$\sqcap$D. The only communication between ABoxes happens through the entailment of new assertions. If the ontology language does not allow such non-deterministic constructors, it is possible to obtain a complete procedure. While the results on the previous sections hold for ALCHOI in general (and even extensions thereof), ontologies in this section are restricted to a Horn fragment of ALCHOI: Definition 4 (Horn ALCHOI) An ALCHOI ontology O is Horn if, for every concept assertion D(a) and every axiom C$\sqsubseteq$D, the concepts C and D satisfy, respectively, the following grammar definitions:

$$C(i) ::= \top | \bot | A | o | C_1 \sqcap C_2 | C_1 \sqcap C_2 | \exists R.C. \quad (1)$$

$$D(i) ::= \top | \bot | A | o | D_1 \sqcap D_2 | \exists R.D | \forall F.D | \neg C. \quad (2)$$

Intuitively, negations and universal restrictions should not occur negatively, and disjunctions should not occur positively. In the following TBox axioms are allowed that are equivalent to Horn axioms. For example, A$\sqcap\neg\forall$R.$\bot\sqsubseteq\neg\forall$S.(B$\sqcap$C) is not Horn according to Definition, but is equivalent to the Horn axiom A$\sqcap\exists$R.T$\sqsubseteq\exists$S.$\neg$(B$\sqcap$C).

It is a well-known property of Horn languages that every consistent Horn ontology has a so-called canonical model that entails exactly the consequences entailed by the ontology.

For the purpose of the paper, a weaker version of this property is required that speaks only about entailment of atomic concept assertions.

Theorem 9 (Weak Canonical Model Property for Horn ALCHOI)

Every consistent Horn ALCHOI ontology 0 has a model I such that I|=A(a) implies O |=A(a) for every atomic concept assertion A(a) with a $\in$ ind(O) and A$\in$con(O).

Theorem 1 can be proved using the property that Horn ALCHOI models are closed under direct products. Then a canonical model is obtained from the direct product of models refuting (finitely many) atomic non-types.

In a first step it is shown that Horn ALCHOI models are closed under direct products. Definition 5 (Direct product of Interpretations). The direct product of interpretations $I_1=(\Delta^{I_1}, \cdot^{I_1})$ and $I_2=(\Delta^{I_2}, \cdot^{I_2})$ is an interpretation $I_1 \times I_2 = (\Delta^{I_1 \times I_2}, \cdot^{I_1 \times I_2})$ where $\Delta^{I_1 \times I_2} = \Delta^{I_1} \times \Delta^{I_2}$, $A^{I_1} \times A^{I_2}$ for $A \in NC$, $o^{I_1 \times I_2} = \{(o^{I_1}, o^{I_2})\}$ for $o \in NO$, $R^{I_1 \times I_2} = \{(\langle d_1, d_2 \rangle, \langle e_1, e_2 \rangle) | (d_1, e_1) \in R^{I_1}, (d_2, e_2) \in R^{I_2}\}$ for $R \in NR$, and $a^{I_1 \times I_2} = \langle a^{I_1}, a^{I_2} \rangle$ for $a \in NI$.

Note from Definition 5 that $I_1 \times I_2 \models A(a)$ if and only if $I1 \models A(a)$ and $I2 \models A(a)$ for every atomic concept assertion $A(a)$.

Lemma 3

Let O be a Horn ALCHOI ontology. Then $I_1 \models O$ and $I_2 \models O$ implies $I_1 \times I_2 \models O$.

Proof First, it is proven by induction that for each C and D defined respectively by (1) and (2), there is $C_1^{I_1 \times I_2} \subseteq C_1^{I_1} \times C_2^{I_2}$ and $D_1^{I_1} \times D_2^{I_2} \subseteq D_1^{I_1 \times I_2}$. Cases for $\top, \bot, A, o$ are trivial.

Case $C = C_1 \sqcap C2$. There is $C_1^{I_1 \times I_2} = (C_1 \sqcap C_2)^{I_1 \times I_2} = C_1^{I_1 \times I_2} \cap C_2^{I_1 \times I_2} \subseteq$ (by induction hypothesis) $(C_1^{I_1} \times C_1^{I_2}) \cap (C_2^{I_1} \times C_2^{I_2}) = (C_1^{I_1} \cap C_2^{I_1}) \times (C_1^{I_2} \cap C_2^{I_2}) = (C_1 \sqcap C_2)^{I_1} \times (C_1 \sqcap C_2)^{I_2} = C^{I_1} \times C^{I_2}$.

Case $C = C_1 \sqcup C2$. There is $C_1^{I_1 \times I_2} = (C_1 \sqcup C_2)^{I_1 \times I_2} = C_1^{I_1 \times I_2} \cup C_2^{I_1 \times I_2} \subseteq$ (by induction hypothesis) $(C_1^{I_1} \times C_1^{I_2}) \cup (C_2^{I_1} \times C_2^{I_2}) \subset (C_1^{I_1} \sqcup C_2^{I_1}) \times (C_1^{I_2} \sqcup C_2^{I_2}) = (C_1 \sqcup C_2)^{I_1} \times (C_1 \sqcup C_2)^{I_2} = C^{I_1} \times C^{I_2}$.

Case $C = \exists R.E$. Let $\langle d_1, d_2 \rangle \in (\exists R.E)^{I_1 \times I_2}$. It can be shown $\langle d_1, d_2 \rangle \in (\exists R.E)^{I_1} \times (\exists R.E)^{I_2}$. Since $\langle d_1, d_2 \rangle \in (\exists R.E)^{I_1 \times I_2}$, there exists $\langle e_1, e_2 \rangle \in E^{I_1 \times I_2}$ such that $((\langle d_1, d_2 \rangle, \langle e_1, e_2 \rangle) \in R^{I_1 \times I_2}$. By applying the induction hypothesis on E, it follows $\langle e_1, e_2 \rangle \in E^{I_1} \times E^{I_2}$ (start star), which implies $e_1 \in E^{I_1}, e_2 \in E^{I_2}$. From (star), it follows $(d_1, e_1) \in R^{I_1}$ and $(d_2, e_2) \in R^{I_2}$, which, together with (star star), implies $d_1 \in (\exists R.E)^{I_1}$ and $d_2 \in (\exists R.E)^{I_2}$. Therefore, $\langle d_1, d_2 \rangle \in (\exists R.E)^{I_1} \times (\exists R.E)^{I_2}$.

Case $D = D_1 \sqcap D_2$. There is $D^{I_1 \times I_2} = (D_1 \sqcap D_2)^{I_1 \times I_2} = D_1^{I_1 \times I_2} \cup D_2^{I_1 \times I_2} \supseteq$ (by induction hypothesis) $(D_1^{I_1} \times D_1^{I_2}) \cap (D_2^{I_1} \times D_2^{I_2}) = (D_1^{I_1} \cap D_2^{I_1}) \times (D_1^{I_2} \cap D_2^{I_2}) = (D_1 \sqcap D_2)^{I_1} \times (D_1 \sqcap D_2)^{I_2} = D^{I_1} \times D^{I_2}$.

$D = \exists R.E$. Let $\langle d_1, d_2 \rangle \in (\exists R.E)^{I_1} \times (\exists R.E)^{I_2}$, it can be shown that $\langle d_1, d_2 \rangle \in (\exists R.E)^{I_1 \times I_2}$. By assumption, $d_1 \in (\exists R.E)^{I_1}$ and $d_2 \in (\exists R.E)^{I_2}$. Thus, there exists $e_1 \in E^{I_1}, e_2 \in E^{I_2}(\dagger)$ such that $(d_1, e_1) \in R^{I_1}, (d_2, e_2) \in R^{I_2}(\ddagger)$. From ($\dagger$), it is that $\langle e_1, e_2 \rangle \in E^{I_1} \times E^{I_2}$. By induction hypothesis, $E^{I_1} \times E^{I_2} \subseteq E^{I_1 \times I_2}$, which implies $\langle e_1, e_2 \rangle \in E^{I_1 \times I_2}$. From ($\ddagger$), it is that $((\langle d_1, d_2 \rangle, \langle e_1, e_2 \rangle) \in R^{I_1 \times I_2}$. Therefore $\langle d_1, d_2 \rangle \in (\exists R.E)^{I_1 \times I_2}$.

Case $D = \forall R.E$. Let $\langle d_1, d_2 \rangle \in (\forall R.E)^{I_1} \times (\forall R.E)^{I_2}(*)$, it can be shown that $\langle d_1, d_2 \rangle \in (\forall R.E)^{I_1 \times I_2}$. Suppose $((\langle d_1, d_2 \rangle, \langle e_1, e_2 \rangle) \in R^{I_1 \times I_2}()$, it can be shown that $\langle e_1, e_2 \rangle \in E^{I_1 \times I_2}$. From (), it is that $(d_1, e_1) \in R^{I_1}$ and $(d_2, e_2) \in R^{I_2}$, which, together with (*), implies $e_1 \in E^{I_1}$ and $e_2 \in E^{I_2}$. Thus $\langle e_1, e_2 \rangle \in E^{I_1} \times E^{I_2}$. By induction hypothesis, $E^{I_1} \times E^{I_2} \subseteq E^{I_1 \times I_2}$. Therefore $\langle e_1, e_2 \rangle \in E^{I_1 \times I_2}$, which is required to show.

Case $D = \neg C$. I tis $(\neg C)^{I_1 \times I_2} = \Delta^{I_1 \times I_2} / 544$ $C^{I_1 \times I_2} = \Delta^{I_1} \times \Delta^{I_2} \setminus C^{I_1 \times I_2}$. By induction hypothesis, $C^{I_1 \times I_2} \subseteq C^{I_1} \times C^{I_2}$. Thus $(\neg C)^{I_1 \times I_2} \supseteq \Delta^{I_1} \times \Delta^{I_2} \setminus C^{I_1} \times C^{I_2}$. Furthermore, $(\neg C^{I_1}) \times (\neg C^{I_2}) = (\overline{\Delta^{I_1}} \backslash C^{I_1}) \times (\Delta^{I_2} \backslash C^{I_2}) = (\Delta^{I_1} \times \Delta^{I_2}) \backslash (C^{I_1} \times \Delta^{I_2}) \backslash (\Delta^{I_1} \times C^{I_2}) \cup (C^{I_1} \times C^{I_2}) \subseteq (\Delta^{I_1} \times \Delta^{I_2}) \backslash (C^{I_1} \times C^{I_2})$ as $C^{I_1} \times \Delta^{I_2} \supseteq C^{I_1} \times C^{I_2}$ and $\Delta^{I_1} \times C^{I_2} \supseteq C^{I_1} \times C^{I_2}$. Thus $(\neg C)^{I_1 \times I_2} \supseteq (\neg C)^{I_1} \times (\neg C)^{I_2}$.

It can be proven that $I_1 \times I_2 \models O$ by showing that, for every $\alpha \in O, I_1 \times I_2 \models \alpha$.

Case $\alpha = C \sqsubseteq D$. It is $C^{I_1 \times I_2} \subset C^{I_1} \times C^{I_2}$. Since $I_1$ and $I_2$ are models of O, $C^{I_1} \subseteq D^{I_1}$ and $C^{I_2} \subseteq D^{I_2}$. Thus, $C^{I_1 \times I_2} \subseteq D^{I_1} \times D^{I_2} \subseteq D^{I_1 \times I_2}$. Hence, $I_1 \times I_2 \models C \sqsubseteq D$.

Case $\alpha = R \sqsubseteq S$. Let $(\langle d_1, d_2 \rangle, \langle e_1, e_2 \rangle)$ be an element of $R^{I_1 \times I_2}$, it can be shown that it is also an element of $S^{I_1 \times I_2}$. Since $(\langle d_1, d_2 \rangle, \langle e_1, e_2 \rangle) \in R^{I_1 \times I_2}$, it is $(d_1, e_1) \in R^{I_1}$ and $(d_2, e_2) \in R^{I_2}$. Thus, $(d_1, e_1) \in S^{I_1}$ and $(d_2, e_2) \in S^{I_2}$ as $I_1 \models R \sqsubseteq S$ and $I_2 \models R \sqsubseteq S$. Therefore, $(\langle d_1, d_2 \rangle, \langle e_1, e_2 \rangle) \in S^{I_1 \times I_2}$.

Case $\alpha = D(a)$. Since $I_1 \models D(a)$ and $I_2 \models D(a), a^{I_1} \in D^{I_1}$ and $a^{I_2} \in D^{I_2}$, which implies $\langle a^{I_1}, a^{I_2} \rangle \in D^{I_1} \times D^{I_2}$. Moreover, $D^{I_1} \times D^{I_2} \subset D^{I_1 \times I_2}$. Therefore, $\langle a^{I_1}, a^{I_2} \rangle \in D^{I_1 \times I_2}$.

This completes the proof of Lemma 3.

Proof of Theorem 1

Let $\Phi = \{A(a)|O \not\models A(a), a \in ind(O), A \in con(O)\}$ be the set of atomic concept assertions over the signature of O not entailed by O. Clearly, $\Phi$ is a finite set, and for each $\alpha_i \in \Phi$, $1 \leq i \leq n = \|\Phi\|$, one can choose a model $I_i \models O$ such that $I_i \not\models \alpha_i$. Let $I = I_1 \times (I_2 \times \ldots \times (I_{n-1} \times I_n))$ (if n=1 it is set that $I = I_1$). Then, by Lemma 3, $I \models O$. Furthermore, for every $A(a) = \alpha_i \in \Phi$, it is that $I \not\models A(a)$ since $I_i \not\models \alpha_i$. Therefore, if $I \models A(a)$ for some $a \in ind(O)$ and $A \in con(O)$, then $A(a) \notin \Phi$ which can only be if $O \models A(a)$. Hence I is as required by Theorem 1.

Before formulating of the completeness result, there is one small technical problem that needs to be solved as illustrated in the following example.

Example 7

Consider $A = \{A(a), B(b), R(a, b)\}$ and $T = \{A \sqcap \exists R.B \sqsubseteq\}$, which consist of Horn axioms. Clearly, $A \cup T \models C(a)$. A realizes two different individual types: $tp(a) = tp_1 = (\{A\}, \{R\}, \emptyset)$ and $tp(b) = tp_2 = (\{B\}, \emptyset, \{R\})$, so the abstraction $B = B_{tp_1} \cup B_{tp_2}$ consist of two ABoxes $B_{tp_1} = \{A(x_{tp_1}), R(x_{tp_1}, y_{tp_1}^R)\}$, and $B_{tp_2} = \{B(x_{tp_2}), R(z_{tp_2}^R, x_{tp_2})\}$. In neither of these ABoxes a new assertion is obtained after materialization, so the procedure terminates without deriving C(a).

In order to see how to fix this problem, note that $B_{tp_2} \cup T \models (\exists R.B)(z_{tp_2}^R)$, so there is an entailed assertion, just not an atomic one. To capture this inference, a new concept is introduced that "defines" $\exists R.B$. Specifically, let $T' = \{\exists R.B \sqsubseteq X, A \sqcap X \sqsubseteq C\}$ where X is a fresh concept name. Clearly, T' is a conservative extension of T (one can extend every model of T to a model of T' by interpreting X as $\exists R.B$), so the assertions for A, B, and C entailed by T' are the same as for T. However, with T' ine can derive a new assertion $B_{tp_2} \cup T' \models X(z_{tp_2}^R)$. If the corresponding assertion X(a) is added to A and a recomputation of the abstraction for the updated type $tp(a) = tp_3 = (\{A, X\}, \{R\}, \emptyset)$ (tp(b) does not change), it is that $B_{tp_3} = \{A(x_{tp_3}), X(x_{tp_3}), R(x_{tp_3}, y_{tp_3}^R)\}$, and one can obtain $B_{tp_3} \cup T' \models C(x_{tp_3})$, which provides the intended result.

Example 7 suggests that to achieve completeness, it is required to represent existential restrictions on the left hand side of the axioms using new atomic concepts. Note that $\exists R.B \sqsubseteq X$ is equivalent to $B \sqsubseteq \forall R^-. X$. Thus it is required that there are no existential restrictions on the left hand side of concept inclusions, and all universal restrictions on the right have only atomic concepts as fillers.

Definition 6 (Normal Form for Horn ALCHOI)

Horn ALCHOI axioms D(a) and $C \sqsubseteq D$ are in normal form if they satisfy the following grammar definitions:

$$C_{(i)} ::= \top \mid \bot \mid A \mid o \mid C_1 \sqcap C_2 \mid C_1 \sqcup C_2 \quad (3)$$

$$D_{(i)} ::= \top \mid \bot \mid A \mid o \mid D_1 \sqcap D_2 \mid \exists R.D \mid \forall R.A \mid \neg C \quad (4)$$

Intuitively, in addition to the constraints for Horn ALCHOI ontologies given by (1) and (2) of Definition 4, negative occurrences of existential restrictions are not allowed, and (positive) occurrences of universal restrictions can only have concept names as fillers. It is easy to convert axioms to such a normal form using the well-known structural transformation. Specifically, one can repeatedly replace every existential restriction $\exists R.C$ in (1) with a fresh concept name X and add a new axiom $C \sqsubseteq \forall R^-.X$. Likewise, one can replace every universal restriction $\forall R.D$ in (2) with $\forall R.Y$ for a fresh concept name Y and add an axiom $Y \sqsubseteq D$. As with Horn axioms, it is required for the axioms in the TBox to be syntactically in the normal form. It is sufficient that they are equivalent to axioms in the normal form the reasoner will still produce the same result. For example, an axiom $\exists R.(A_1 \sqcap A_2) \sqcap B_1 \sqcap B_2$ can be left untouched because it is equivalent to an axiom $A_1 \sqcap A_2 \sqsubseteq \forall R^-.B_1 \sqcap \forall R^-.B_2$ in normal form. Note that the axiom $A \sqcap \forall R.B \sqsubseteq C$ in T from Example is not equivalent to the pair of axioms $\forall R.B \sqsubseteq X$, $A \sqcap X \sqsubseteq C$ in T because the latter axioms contain a new symbol X. In fact, $A \sqcap \exists R.B \sqsubseteq C$ is not equivalent to any axiom(s) in normal form.

Completeness Proof

The completeness result follows as described in the following:

Theorem 2

Let $O = A \cup T$ be a normalized Horn ALCHOI ontology and B the abstraction of A. O is concept materialized if, for every type $tp = (tp_\downarrow, tp_\rightarrow, tp_\leftarrow)$, every individual $a \in ind(A)$ with $tp(a) = tp$, and every atomic concept A, it is that:

(1) $B \cup T \vDash A(x_{tp})$ implies $A(a) \in A$,
(2) $B \cup T \vDash A(y_{tp}^R)$ and $R(a,b) \in A$ implies $A(b) \in A$, and
(3) $B \cup T \vDash A(z_{tp}^S)$ and $S(c, a) \in A$ implies $A(c) \in A$.

Proof

To prove Theorem 2, the abstraction B of A is extended with new role assertions $R(x_{tp(a)}, x_{tp(b)})$ for every $R(a, b) \in A$. Let denote this extended abstract ABox by B'. Since, for every $C(a) \in A$, it's also the case that $C \in tp_\downarrow(a)$ and, thus, $C(x_{tp(a)}) \in B \subseteq B'$, the mapping h: $ind(A) \rightarrow ind(B')$ defined by $h(a) = x_{tp(a)}$ is a homomorphism from A to B'. Therefore, by Lemma 1, if $A \cup T \vDash A(a)$, then $B' \cup T \vDash A(x_{tp(a)})$. The key part of the proof is to demonstrate that in this case also $B \cup T \vDash A(x_{tp(a)})$. That is, the extended abstract ABox B' does not entail new atomic concept assertions compared to B. It follows then that $A(a) \in A$ by condition (1) of the theorem. This implies that O is concept materialized.

To prove that B' entails the same atomic concept assertions as B, the remaining conditions (2) and (3) of Theorem 2 are used and the canonical model property formulated in Theorem 1. Note that since new role assertions of the form $R(x_{tp(a)}, x_{tp(b)})$ are added to B' only if $R(a, b) \in A$, there is $R \in tp_\rightarrow(a)$ and $R \in tp_\leftarrow(b)$ by Definition 2. Therefore, there are already role assertions $R(x_{tp(a)}, y_{tp(a)}^R) \in B$ and likewise $R(z_{tp(b)}^R, x_{tp(b)}) \in B$ for the same role R. Furthermore, by condition (2) of Theorem 2, if $B \cup T \vDash A(y_{tp(a)}^R)$, then since $R(a, b) \in A$, there is $A(b) \in A$, and thus $A(x_{tp(b)}) \in B$. Likewise, by condition (3), if $B \cup T \vDash A(z_{tp(b)}^R)$, then $A(x_{tp(a)}) \in B$. The following lemma shows that with these properties for B, after adding the new role assertion $R(x_{tp(a)}, x_{tp(b)})$ to B, no new atomic concept assertions can be entailed.

Lemma 4 (Four-Individual Lemma)

Let O be a normalized Horn ALCHOI ontology such that $\{R(x_1, y_1), R(z_2, x_2)\} \subseteq O$ for some $x_1, y_1, z_2, x_2$, and R. Further, assume that for every concept name A there is:

(1) $O \vDash A(y_1)$ implies $O \vDash A(x_2)$, and
(2) $O \vDash A(z_2)$ implies $O \vDash A(x_1)$.

Finally, let $O' = O \cup \{R(x_1, x_2)\}$. Then for every concept name A and every individual a, there is $O' \vDash A(a)$ implies $O \vDash A(a)$.

Proof

Suppose that $O' \vDash A(a)$. It can be shown that $O \vDash A(a)$. If O is inconsistent then this holds trivially. Otherwise, there exists a model Z of O satisfying Theorem 1. From I one cane construct an interpretation I' such that $$\Delta^{I'} = \Delta^I$$

$x^{I'} = x^I$ for every individual x
$A^{I'} = A^I$ for every concept name A $$S^{I'} = S^I \cup \begin{cases} \{(x_1^I, x_2^I)\} & \text{if } O \vDash R \sqsubseteq S \text{ and } O \not\vDash R \sqsubseteq S^- \\ \{(x_2^I, x_1^I)\} & \text{if } O \vDash R \sqsubseteq S^- \text{ and } O \not\vDash R \sqsubseteq S \\ \{(x_1^I, x_2^I), (x_2^I, x_1^I)\} & \text{if } O \vDash R \sqsubseteq S \text{ and } O \vDash R \sqsubseteq S^- \\ \emptyset & \text{otherwise} \end{cases}$$

for every role name S, where $x_1$, $x_2$, and R are given in the lemma.

It can be proven that $I' \vDash O'$, which implies $I' \vDash A(a)$ since $O' \vDash A(a)$, and thus $I \vDash A(a)$ by definition of I', from which $O \vDash A(a)$ follows since I satisfies Theorem. First, by induction it can be proven that for each C and D defined respectively by (3) and (4), there is $C^I = C^{I'}$ and $D^I \subseteq D^{I'}$. Cases for $\top$, $\bot$, A, o are trivial.

Case $C = C_1 \sqcup C_2$ or $C = C_1 \sqcap C_2$. By induction hypothesis, $C_1^{I'} = C_1^I$, $C_2^{I'} = C_2^I$. Therefore, $(C_1 \sqcup C_2)^{I'} = C_1^{I'} \cup C_2^{I'} = C_1^I \cup C_2^I = (C_1 \sqcup C_2)^I$. Similarly, $(C_1 \sqcap C_2)^{I'} = (C_1 \sqcap C_2)^I$.

Case $D = D_1 \sqcap D_2$. By induction hypothesis, $D_1^I \subseteq C_1^{I'}$, $D_2^I \subseteq D_2^{I'}$. Hence, $(D_1 \sqcap D_2)^I = D_1^I \cap D_2^I \subseteq D_1^{I'} \cap D_2^{I'} = (D_1 \sqcap D_2)^{I'}$.

Case $D = \neg C$. Since $C^I = C^{I'}$, it is that $D^I = D^{I'}$, thus, $D^I \subseteq D^{I'}$.

Case $D = \exists P.D'$. Let d be an arbitrary element of $D^I$, it can be shown that $d \in D^{I'}$. Since $d \in D^I$, there exists $d' \in \Delta^I$ such that $(d, d') \in P^I$ and $d' \in D'^I$. Since $P^I \subseteq P^{I'}$, and by induction hypothesis $D'^I \subseteq D'^{I'}$, there is $(d, d') \in P^{I'}$ and $d' \in D'^{I'}$. Thus $d \in D^{I'}$.

Case $D = \forall S.A$, where $A \in con(O)$. S could be a role name or the inverse of a role name. In the following the former is considered, since the latter can be treated similarly. If $O \not\vDash R \sqsubseteq S$ and $O \not\vDash R \sqsubseteq S^-$, then $S^I = S^{I'}$ and hence $D^I \subseteq D^{I'}$.

Two subcases are considered: $O \vDash R \sqsubseteq S$ or $O \vDash R \sqsubseteq S^-$.

Case $O \vDash R \sqsubseteq S$. Take any $d \in D^I$. To show that $d \in D^{I'}$, one needs to prove that $d' \in A^{I'}$ for every d' with $\langle d, d' \rangle \in S^{I'}$. If $\langle d, d' \rangle \in S^I$, this is obvious. Otherwise, $\langle d, d' \rangle = \langle x_1^I, x_2^I \rangle$. By assumption, $I \vDash R(x_1, y_1)$ and $O \vDash R \sqsubseteq S$, hence $I \vDash S(x_1, y_1)$, which, together with $d = x_1^x \in D^I$, implies $y_1^I \in A^I$. Thus $I \vDash A(y_1)$. Since I satisfies Theorem 1, there is $O \vDash A(y_1)$. By condition (1), $O \vDash A(x_2)$. Thus $d' = x_2^I \in A^I = A^{I'}$, and hence, $d = x_1^I \in D^{I'}$, which was required to show.

Case O⊨ R⊑S⁻ is similar to the case O⊨ R⊑S. The only differnce is that Condition (2) is used instead of Condition (1).

It remains to show that I'⊨ O', where O'=O∪{R(x₁,x₂)}. Since I⊨ O, for every C⊑D∈O there is $C^{I'}=C^I\subseteq D^I\subseteq D^{I'}$, for every D(a)∈O there is $a^{I'}=a^I\in D^I\subseteq D^{I'}$, and for every R(a,b)∈O there is $\langle a^{I'},b^{I'}\rangle=\langle a^I,b^I\rangle\in R^I\subseteq R^{I'}$. Finally, The definition of I' ensures that for every role inclusion S⊑P∈O there is $S^{I'}\subseteq P^{I'}$, and that I'⊨ R(x₁,x₂). Thus I'⊨ O'.

By repeatedly applying Lemma 4 for each $x_1=x_{tp(a)}$, $y_1=y_{tp(a)}^R$, $x_2=x_{t(b)}$, $z_2=z_{tp(b)}^R$ and R such that R(a,b)∈A, it is obtained that B' entails only those atomic assertions that are entailed by By, which completes the proof of Theorem 2.

Theoretical ABox Size Reduction through Abstraction

This section contains theoretical statistical results about the ABox size reduction one can expect when using the abstraction and refinement procedure for concept materialization of ALCHOI ontologies. Given a TBox and a finite set of individuals, we consider all possible random ABoxes (consisting of assertions for these individuals using the concept and roles occurring in the TBox) in order to:

1. compute an upper bound for the proportion of ABoxes that may be smaller than their abstraction
2. compute a lower bound for the average size reduction achieved by the abstraction Given a TBox T and a finite set of individual names $A^I\subseteq N_I$, we consider all the possible ABoxes A using only concept and role names occurring in T and individual names of $A^I$ (i.e. such that con(A)⊆con(T), rol(A)⊆rol(T) and ind(A)⊆$A^I$). The abstract ABox B of an ABox A uses a fresh individual $x_t$ (not occurring in the original ontology) for each abstract type t it defines, as well as fresh individuals $y_z^R$ and/or $z_t^R$ for the type and role combinations occurring in B. The abstract ABox B B consists only of assertions of the form $C(x_t)$, $R(x_t, y_t^R)$ or $R(z_t^R, x_t)$, hence each assertion in B involves an $x_t$ individual.

The abstraction and refinement procedure is complete for concept materialization for ontologies having a Horn normal form equivalent. Having made no assumption about T, a normalization step might be necessary. This step may introduce new atomic concepts for some existential or universal concept expressions in T, hence B may contain more concept assertion for a single individual than A. We note $T_n$ the normalized version of T that will be used with the abstract ABoxes B. Remark: con($T_n$)⊇con(T) and rol($T_n$)=rol(T).

For readability, we will use the following notation:

A=‖con(T)‖ for the number of distinct atomic concepts that may occur in A
R=‖rol(T)‖ for the number of distinct atomic roles that may occur in A or B
I=‖$A^I$‖ for the number of distinct individuals that may occur in A
$A_n$=‖rol($T_n$)‖ for the number of distinct atomic concepts that may occur in B
X for the number of $x_t$ individuals in B The vocabulary of the original ontology allows A·I distinct class assertions of the form C(a) and R·I² distinct role assertions of the form R(a, b). Therefore the maximum size of the original ABox A is:

$$\max_A=R\cdot I^2+A\cdot I$$

The vocabulary of the abstract ontology allows $A_n$ distinct class assertions of the form $C(x_t)$ and there are (by construction) at most 2 role assertions per abstract type $x_t$ and role R, one of the form $R(x_t, y_1^R)$ and one of the form $R(z_t^R, x_t)$. Therefore the maximum size of the abstract ABox B is:

$$A_n\cdot X+2\cdot R\cdot X=(A_n+2\cdot R)\cdot X$$

As there is at most one abstract type per individual, we have: X≤I. Therefore the size of the abstract ABox B is at most:

$$\max_B=(A_n+2\cdot R)\cdot I$$

Remark: Note that this expression only depends on the TBox and the number of considered individuals.

If an ABox A contains more than $\max_B$ assertions, then the corresponding abstract ABox B will be smaller.

$$\|A\|>\max_B \Longrightarrow \|A\|>\|B\|$$

Remark: Even if an A has less than $\max_B$ assertions, B may be smaller.

$$\|A\|\leq\max_B \not\Rightarrow \|A\|\leq\|B\|$$

Proportion of ABoxes Smaller than their Abstraction

An original ABox A may contain between 0 to $\max_A$ assertions out of the $\max_A$ possible assertions. The number of possibilities for choosing k elements from n being given by $$\binom{n}{k}=\frac{n!}{k!(n-k)!}$$

the total number of possible original ABoxes is:

$$num_A=\sum_{j=0}^{\max_A}\binom{\max_A}{j}$$

Using the binomial theorem:

$$\sum_{j=0}^{n}\binom{n}{j}\cdot x^j\cdot y^{n-j}=(x+y)^n$$

with $n=\max_A$ and x=y=1, we get the number of possible distinct ABoxes:

$$num_A=2^{\max_A}=2^{R\cdot I^2+A\cdot I}$$

Building on the previous observations, the number of original ABoxes with less than $\max_B$ assertions is:

$$num_{\mathcal{A}<\mathcal{B}}=\sum_{j=0}^{\max_B}\binom{\max_\mathcal{A}}{j}$$

There is no closed formula for this general partial sum of the binomial coefficient:

$$\sum_{j=0}^{k}\binom{n}{j}$$

but we can compute an upper bound. We first note that:

$$\binom{n}{j} = \frac{n!}{j! \cdot (n-j)!} = \frac{n \cdot (n-1) \cdot \ldots \cdot (n-j-1)}{j!} \leq \frac{n^j}{j!}$$

So we have:

$$\sum_{j=0}^{k} \binom{n}{j} \leq \sum_{j=0}^{k} \frac{n^j}{j!}$$

Multiplying $$\frac{n^j}{j!} \text{ by } \frac{k!}{(k-j)!} (\geq 1)$$

we get:

$$\sum_{j=0}^{k} \binom{n}{j} \leq \sum_{j=0}^{k} \frac{k!}{j! \cdot (k-j)!} \cdot n^j = \sum_{j=0}^{k} \binom{k}{j} \cdot n^j$$

and using the binomial theorem:

$$\sum_{j=0}^{n} \binom{n}{j} \cdot x^j \cdot y^{n-j} = (x+y)^n$$

with n k, x=n and y=1 we obtain:

$$\sum_{j=0}^{k} \binom{k}{j} \leq (n+1)^k$$

In our case $n=\max_A$ and $k=\max_B$. So we get the following upper bound for the number of ABoxes that may be smaller than their abstraction:

$$\text{num}_{A<B} \leq (\max_A + 1)^{\max_B} = (R \cdot I^2 + A \cdot I + 1)^{(A \circ A_n + 2 \cdot R) \cdot I}$$

Using the values and bounds from this section as well as the result from the previous section, we can state that the proportion of ABoxes smaller than their abstraction is lower than:

$$\text{prop}_{\mathcal{A}<\mathcal{B}} \leq \frac{\text{num}_{\mathcal{A}<\mathcal{B}}}{\text{num}_{\mathcal{A}}}$$
$$= \frac{(\max_{\mathcal{A}}+1)^{\max_{\mathcal{B}}}}{2^{\max_{\mathcal{A}}}}$$
$$= \left(\frac{(R \cdot I^2 + A \cdot I + 1)^{A_n + 2 \cdot R}}{2^{R \cdot I + A}}\right)^I$$

Remark: This proportion tends exponentially towards 0 with the number of individuals in the ontology as soon as $2^{R \cdot I + A} > (R \cdot I^2 + A \cdot I + 1)^{A_n + 2 \cdot R}$.

Average ABox Size Reduction through Abstraction

Building on the formula used to count the possible original ABoxes, we can state that the sum of the sizes of all the possible ABoxes is:

$$\text{sum}_{\mathcal{A}} = \sum_{j=0}^{\max_{\mathcal{A}}} \binom{\max_{\mathcal{A}}}{j} \cdot j$$

From the binomial theorem:

$$\sum_{j=0}^{n} \binom{n}{j} \cdot x^j \cdot y^{n-j} = (x+y)^n$$

by setting y=1 and differentiating with respect to x, we get:

$$\sum_{j=0}^{n} \binom{n}{j} \cdot j \cdot x^{j-1} = n \cdot (x+1)^{n-1}$$

with x=1 we obtain:

$$\sum_{j=0}^{n} \binom{n}{j} \cdot j = n \cdot 2^{n-1}$$

In our case $n=\max_A$, so the sum of the sizes of all the possible ABoxes is:

$$\text{sum}_A = (\max_A) \cdot 2^{\max_A - 1}$$

Using the number of original ABoxes, we get the following average size:

$$\text{avg}_{\mathcal{A}} = \frac{\text{sum}_{\mathcal{A}}}{\text{num}_{\mathcal{A}}} = \frac{(\max_{\mathcal{A}}) \cdot 2^{\max_{\mathcal{A}}-1}}{2^{\max_{\mathcal{A}}}} = \frac{\max_{\mathcal{A}}}{2} = \frac{R \cdot I^2 + A \cdot I}{2}$$

By dividing the maximum size of the abstract ABox B by the average size of the original ABox A, we get an upper bound for the average ration between the sizes of the two ABoxes. This allows us to compute a lower bound for the size reduction achieved by the abstraction:

$$\text{red}_{\mathcal{A} \to \mathcal{B}} \leq 1 - \frac{\max_{\mathcal{B}}}{\text{avg}_{\mathcal{A}}} = 1 - \frac{2 \cdot (A_n + 2 \cdot R)}{R \cdot I + A}$$

Remark: As awaited, the size reduction increases with the number of individuals.

Numerical Evaluation of the Size Reduction

The table in FIG. 9. exhibits the extremely small probability of an eventual non-reduction of the size of the ABox through abstraction, the extremely high average size reduction one can expect as well as the influence of the different factors on these values for random ABoxes. The first line means that for a TBox having 10 concept names, 100 role names and 2 times more concept names in the normalized version than in the original one, then for 1000 individuals the proportion of ABoxes that may be bigger than their abstraction is less than $10^{-28.346.001}$ (less than one out of 10 . . . 0 with 28 millions zeros) and the average size reduction achieved by the abstraction is higher than 99.56%.

It will be readily apparent to the skilled person that the methods, the elements, units and apparatuses described in connection with embodiments of the invention may be implemented in hardware, in software, or as a combination of both. In particular it will be appreciated that the embodiments of the invention and the elements, modules or means described in connection therewith and implementing the invention as a whole or in part may be implemented by a computer program or computer programs running on a computer or being executed by a microprocessor.

The invention claimed is:

1. A computer-implemented method for computing a concept materialization of an ontology O,
wherein O is a formal explicit description of concepts and roles in a domain of discourse comprising:
an ABox A, referring to
data elements, called individuals, in terms of asserted or inferred concept assertions, and
role assertions, expressing a directed relationship that relates one individual, called source, with a second individual, called target, with respect to a particular role, and
a TBox T, referring to schema axioms about concepts and roles,
wherein concept materialization refers to computing all entailed atomic concepts of all individuals,
wherein entailment is defined according to the semantics of a description language used to specify ontology O,
the computer-implemented method comprising the following steps:
(1) building an ABox B, being an abstract representation of ABox A, based on equivalence classes of individuals in ABox A, wherein individuals fall into the same equivalence class if they are asserted to the same concepts and if they are the source of the same roles and if they are target of the same roles, wherein the ABox B contains for each equivalence class E
a fresh individual I with the same concept assertions as the individuals in E, and
for each role $R_j$ for which the individuals in E appear as source in a role assertion for $R_j$, a corresponding fresh individual $I_{Rj}$ and a role assertion for role $R_j$ with I as source and $I_{Rj}$ as target, and
for each role $R_k$ for which the individuals in E appear as target in a role assertion for $R_k$, a corresponding fresh individual $I_{Rk}$ and a role assertion for role $R_k$ with $I_{Rk}$ as source and I as target;
(2) materializing all entailed concept assertions of ABox B with respect to TBox T of the ontology O using ontology reasoning;
(3) extending ABox A by adding, if not already included, assertions to obtain ABox A' so that ABox A' includes for all equivalence classes E:
(i) concept assertions for all individuals of E corresponding to entailed concept assertions for fresh individual I in ABox B representing equivalence class E;
(ii) concept assertions for all individuals in ABox A which are source respectively target of a role assertion with role R corresponding entailed concept assertions in ABox B for an individual that is source respectively target of role assertion with role R and an individual I in ABox B representing equivalence class E;
(4) if new assertions are added by the extending in step (3) repeat from step (1), wherein ABox A should be the extended ABox A' provided by step (3);
wherein the transformed ontology O' is obtained from O by replacing the original ABox A with the final extended ABox A', being a concept materialized version of the original input ABox A.

2. The method of claim 1, wherein the ontology O uses Description Logic DL as the formal knowledge representation language, which is a Horn ALCHOI description logic fragment.

3. The method of claim 2,
wherein step (2) uses a normalized version T of TBox T, wherein TBox T is obtained by normalizing TBox T by introducing new concepts to T' as replacement for complex concept expressions in T as well as by adding axioms to T' designed to preserve the entailments of T, wherein a TBox is normalized if all its concept expressions follow grammar restrictions specified by the Horn ALCHOI normal form.

4. The method of claim 3, wherein all concept assertions for concepts introduced during the normalizing are removed from the final extended ABox A'.

5. The method of claim 1, wherein the accessing and storing of individuals, concept and role assertions of ABox A and its extensions is performed by a database.

6. An article of manufacture comprising a computer program product, which comprises computer program code for computing a concept materialization of an ontology O,
wherein O is a formal explicit description of concepts and roles in a domain of discourse comprising:
an ABox A, referring to
data elements, called individuals, in terms of asserted or inferred concept assertions, and
role assertions, expressing a directed relationship that relates one individual, called source, with a second individual, called target, with respect to a particular role, and
a TBox T, referring to schema axioms about concepts and roles, wherein concept materialization refers to computing all entailed atomic concepts of all individuals,
wherein entailment is defined according to the semantics of a description language used to specify ontology O,
the computer program code comprising:
computer program code for (1) building an ABox B, being an abstract representation of ABox A, based on equivalence classes of individuals in ABox A, wherein individuals fall into the same equivalence class if they are asserted to the same concepts and if they are the source of the same roles and if they are target of the same roles, wherein the ABox B contains for each equivalence class E
a fresh individual I with the same concept assertions as the individuals in E, and
for each role $R_j$ for which the individuals in E appear as source in a role assertion for $R_j$, a corresponding fresh individual $I_{Rj}$ and a role assertion for role $R_j$ with I as source and $I_{Rj}$ as target, and
for each role $R_k$ for which the individuals in E appear as target in a role assertion for $R_k$, a corresponding fresh individual $I_{Rk}$ and a role assertion for role $R_k$ with $I_{Rk}$ as source and I as target;

computer program code for (2) materializing all entailed concept assertions of ABox B with respect to TBox T of the ontology O using ontology reasoning;

computer program code for (3) extending ABox $_A$ by adding, if not already included, assertions to obtain ABox A' so that ABox A' includes for all equivalence classes E:
  (i) concept assertions for all individuals of E corresponding to entailed concept assertions for fresh individual I in ABox B representing equivalence class E;
  (ii) concept assertions for all individuals in ABox A which are source respectively target of a role assertion with role R corresponding entailed concept assertions in ABox B for an individual that is source respectively target of role assertion with role R and an individual I in ABox B representing equivalence class E;

computer program code for (4) repeating from step (1) if new assertions are added by the extending in step (3), wherein ABox A should be the extended ABox A' provided by step (3);

wherein the transformed ontology O' is obtained from O by replacing the original ABox A with the final extended ABox A', being a concept materialized version of the original input ABox A.

7. An apparatus for computing a concept materialization of an ontology O,
  wherein O is a formal explicit description of concepts and roles in a domain of discourse comprising:
  an ABox A, referring to
    data elements, called individuals, in terms of asserted or inferred concept assertions, and
    role assertions, expressing a directed relationship that relates one individual, called source, with a second individual, called target, with respect to a particular role, and
  a TBox T, referring to schema axioms about concepts and roles,
  wherein concept materialization refers to computing all entailed atomic concepts of all individuals,
  wherein entailment is defined according to the semantics of a description language used to specify ontology O,
  the apparatus comprising:
  (1) means for building an abstraction, ABox B, of ABox A, being an abstract representation of ABox A, based on equivalence classes of individuals in ABox A, wherein individuals fall into the same equivalence class if they are asserted to the same concepts and if they are the source of the same roles and if they are target of the same roles, wherein the ABox B contains for each equivalence class E:
    a fresh individual I with the same concept assertions as the individuals in E, and
    for each role $R_j$ for which the individuals in E appear as source in a role assertion for a corresponding fresh individual $I_{Rj}$ and a role assertion for role $R_j$ with I as source and $I_{Rj}$ as target, and
    for each role $R_k$ for which the individuals in E appear as target in a role assertion for $R_k$, a corresponding fresh individual $I_{Rk}$ and a role assertion for role $R_k$ with $I_{Rk}$ as source and I as target;
  (2) means for materializing all entailed concept assertions of ABox B with respect to TBox T of the ontology O using ontology reasoning,
  (3) means for extending ABox A, by adding, if not already included, assertions to obtain ABox A' so that ABox A' includes for all equivalence classes E:
    (i) concept assertions for all individuals of E corresponding to entailed concept assertions for fresh individual I in ABox B representing equivalence class E;
    (ii) concept assertions for all individuals in ABox A which are source respectively target of a role assertion with role R corresponding entailed concept assertions in ABox B for an individual that is source respectively target of role assertion with role R and an individual I in ABox B representing equivalence class E;
  (4) means for controlling iterative refinement such that, if new assertions are added by the means for extending, the operation proceeds such that it repeats from the building of an abstraction, wherein ABox A should be the extended ABox A' provided by the means for extending;
  wherein the transformed ontology O' is obtained from O by replacing the original ABox A with the final extended ABox A', being a concept materialized version of the original input ABox A.

* * * * *